United States Patent
O'Connor et al.

(10) Patent No.: US 8,790,731 B2
(45) Date of Patent: *Jul. 29, 2014

(54) BATTER-LIKE COMPOSITIONS CONTAINING SETTING AGENT AND METHODS OF PREPARING AND USING SAME

(75) Inventors: Christine M. O'Connor, Rogers, MN (US); David J. Domingues, Plymouth, MN (US); Karin C. Gaertner, Andover, MN (US); James D. Fischer, Ham Lake, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/927,235

(22) Filed: Nov. 9, 2010

(65) Prior Publication Data

US 2011/0070339 A1    Mar. 24, 2011

Related U.S. Application Data

(62) Division of application No. 11/462,179, filed on Aug. 3, 2006, now abandoned.

(60) Provisional application No. 60/705,035, filed on Aug. 3, 2005.

(51) Int. Cl.
*A21D 10/00* (2006.01)
*A21D 10/04* (2006.01)
*A21D 2/16* (2006.01)
*A23L 1/053* (2006.01)

(52) U.S. Cl.
CPC .............. *A21D 10/04* (2013.01); *A21D 2/165* (2013.01); *A23L 1/053* (2013.01)
USPC ........................................... 426/552; 426/573

(58) Field of Classification Search
CPC ......... A21D 2/165; A21D 10/04; A23L 1/053
USPC ................................................. 426/552, 573
See application file for complete search history.

(56) References Cited

U.S. PATENT DOCUMENTS

| | | | |
|---|---|---|---|
| 2,715,580 A | 8/1955 | Harrel | |
| 3,222,189 A | 12/1965 | Perrozzi | |
| 3,620,763 A | 11/1971 | Hans | |
| 3,649,304 A | 3/1972 | Fehr et al. | |
| 3,697,283 A | 10/1972 | Rogers et al. | |
| 3,711,297 A | 1/1973 | Strobel et al. | |
| 3,767,421 A | 10/1973 | Gulstad | |
| 3,769,028 A | 10/1973 | Katz | |
| 4,275,088 A | 6/1981 | Hart et al. | |
| 4,444,799 A | 4/1984 | Vanderveer et al. | |
| 4,456,625 A | 6/1984 | Durst | |
| 4,587,126 A | 5/1986 | Patton et al. | |
| 4,624,856 A | 11/1986 | Vanderveer et al. | |
| 4,904,493 A | 2/1990 | Petrizzelli | |
| 5,403,610 A | 4/1995 | Murphy et al. | |
| 5,405,636 A | 4/1995 | Gard et al. | |
| 5,409,720 A | 4/1995 | Kent et al. | |
| 5,409,723 A | 4/1995 | Okutomi et al. | |
| 5,431,944 A * | 7/1995 | Melvej ......................... | 426/552 |
| 5,458,904 A | 10/1995 | Zolper | |
| 5,620,713 A | 4/1997 | Rasmussen | |
| 5,804,243 A | 9/1998 | Loh et al. | |
| 5,855,945 A | 1/1999 | Laughlin et al. | |
| 6,039,994 A | 3/2000 | LeFlecher et al. | |
| 6,048,564 A | 4/2000 | Young et al. | |
| 6,056,984 A | 5/2000 | Ekanayake et al. | |
| 6,099,887 A | 8/2000 | Van Eendenburg et al. | |
| 6,165,524 A | 12/2000 | Narayanaswamy | |
| 6,217,929 B1 | 4/2001 | Hahn | |
| 6,224,925 B1 | 5/2001 | Narayanaswamy | |
| 6,228,403 B1 | 5/2001 | Narayanaswamy et al. | |
| 6,248,388 B1 | 6/2001 | Van Eendenburg et al. | |
| 6,261,613 B1 | 7/2001 | Narayanaswamy | |
| 6,391,366 B1 | 5/2002 | Boldon | |
| 6,561,235 B2 | 5/2003 | Finkowski | |
| 6,715,518 B2 | 4/2004 | Finkowski | |
| 6,869,059 B2 | 3/2005 | Sloan | |

(Continued)

FOREIGN PATENT DOCUMENTS

GB    1105922    3/1968
JP    2005278534 A * 10/2005

(Continued)

OTHER PUBLICATIONS

Phillips.; Williams, P.A. (2000). Handbook of Hydrocolloids., Woodhead Publishing, pp. 103-115.*
Bokanga et al., "Physicochemical Properties and Starch Granular Characteristics of Flour from Various Manihot Esculente (Cassava) Genotypes", Journal of Food Science, 67:5, 1701-1705.
Phillips, G.O.; Williams, P.A. (2000). Handbook of Hydrocolloids., Woodhead Publishing, pp. 87-102.
Gisslen, Wayne, "Professional Baking," 1986, p. 195.

* cited by examiner

*Primary Examiner* — Jyoti Chawla
(74) *Attorney, Agent, or Firm* — John L. Crimmins; Paul J. Parins; Mara E. DeBoe

(57) ABSTRACT

The invention provides batter-like compositions including flour or a flour replacement ingredient, sweetener, a fat source, a chemical leavening system, and a setting agent. The resulting batter-like compositions are capable of being formed into discrete product pieces (such as pucks), and maintaining the puck form throughout storage and handling of the batter-like composition prior to baking. The invention further provides methods of preparing batter-like compositions having a discrete form, and methods of using such batter-like compositions to provide baked goods.

20 Claims, No Drawings

(56) References Cited

U.S. PATENT DOCUMENTS

| | | |
|---|---|---|
| 7,067,167 B2 | 6/2006 | Damsgard |
| 8,088,430 B1 | 1/2012 | Schlegel et al. |
| 2003/0003213 A1 | 1/2003 | Drantch et al. |
| 2003/0049358 A1 | 3/2003 | Domingues |
| 2003/0134023 A1* | 7/2003 | Anfinsen .................. 426/549 |
| 2003/0138540 A1 | 7/2003 | Braginsky et al. |
| 2005/0037124 A1 | 2/2005 | Gilbert et al. |
| 2005/0153023 A1 | 7/2005 | Overton |
| 2006/0024416 A1 | 2/2006 | Casper et al. |
| 2007/0048426 A1 | 3/2007 | Kou et al. |
| 2007/0065554 A1 | 3/2007 | O'Connor et al. |
| 2008/0063751 A1 | 3/2008 | Kou |
| 2008/0280003 A1 | 11/2008 | Coyle et al. |

FOREIGN PATENT DOCUMENTS

| | | |
|---|---|---|
| WO | WO99/04640 | 2/1999 |
| WO | WO2006/018423 | 2/2006 |
| WO | WO2007/011884 | 1/2007 |
| WO | WO2007/130070 | 11/2007 |

BATTER-LIKE COMPOSITIONS CONTAINING SETTING AGENT AND METHODS OF PREPARING AND USING SAME

CROSS-REFERENCES TO RELATED APPLICATIONS

This application is a divisional application of U.S. patent application Ser. No. 11/462,179, filed Aug. 3, 2006, now abandoned which claims the benefit of priority under 35 U.S.C. §119(e)(1) of a U.S. provisional patent application Ser. No. 60/705,035, filed Aug. 3, 2005, the entire disclosure of which is incorporated herein by reference.

FIELD OF THE INVENTION

The invention relates to farinaceous batter-like compositions. The farinaceous batter-like compositions include a reversible setting agent. The invention further relates to methods of making such batter-like compositions, as well as baked goods made from such batter-like compositions.

BACKGROUND OF THE INVENTION

Certain moist baked goods such as muffins, pancakes, cakes, brownies, and the like are typically made from scratch or from a dry mix, where consumers make a batter by adding liquids to dry ingredients and then bake the batter soon after mixing. While these methods can produce high quality baked goods, preparation of the batters can be time consuming and messy. Additionally, the batter should be used by the consumer immediately to provide for optimum leavening action and because the batters are not microbiologically stable.

Some of these issues have been overcome by preparing muffins and other batter-based baked goods from frozen batters, which require the consumer to thaw prior to baking the batter (a time consuming step). However, the refrigerated storage life of the thawed batter is typically short (often on the order of a few days). If the entire batch is not used relatively quickly, there is a risk that the unused portion of the batter will spoil and be wasted.

There exist some premixed refrigerated doughs, such as bread dough, cookie dough, and the like. These doughs typically need to be hermetically sealed, stored under pressure and/or placed in modified atmosphere packaging (MAP) in order to provide good shelf stability properties under refrigerated storage conditions. As a result, after the consumer opens the packaging for initial use of the product, the refrigerated dough cannot be stored for long periods of time thereafter.

SUMMARY OF THE INVENTION

Generally, the invention provides batter-like compositions comprising flour or a flour replacement, sweetener, a fat component, a leavening system, water, and a setting agent such as gelatin, carrageenans, or other similarly propertied hydrocolloid or gum. One aspect of the invention allows one to form and cut the batter-like composition to create and maintain discrete, generally non-flowable, substantially non-sticky intermediate farinaceous product units (pieces) for storage and use by a consumer, as described in detail herein. The invention thus provides batter-like compositions that possess some of the desirable features of conventional batters (particularly when the batter-like compositions are exposed to baking temperatures), yet provide a unique intermediate product that is not indicative of batters (by being generally non-flowable and substantially non-sticky at temperatures below typical baking temperatures).

The batter-like compositions include a setting agent that provides the unique handling properties described herein. The setting agent comprises a continuous phase throughout the batter-like composition at temperatures below the melting point of the setting agent, thereby imparting rheological properties akin to a solid and/or semi-solid (non-fluid) material. Upon baking, the setting agents soften, reverting the batter-like composition to an aqueous continuous phase akin to conventional batter systems that bake accordingly.

In some aspects, the invention also provides intermediate farinaceous products that are formed from the batter-like compositions. According to these aspects, the intermediate farinaceous products are in the form of discrete, generally non-flowable units that can maintain a desired form and be handled by a manufacturer and consumer, even when the intermediate farinaceous product warms to temperatures above the freezing point of the batter-like composition. In some aspects, the intermediate farinaceous products are substantially non-sticky at temperatures below baking temperatures, such that they can be easily handled by a manufacturer or consumer (e.g., picked up and placed in appropriate bakeware). When used to describe the intermediate farinaceous products, the phrase "discrete units," refers to portions of the composition that possess a definite, generally non-flowable and individual form, as compared to indefinite length materials intended to be divided from one another at a subsequent time after preparation and packaging (for example, at the point of use, upon removal of the batter-like composition from storage for baking). The discrete units can be any defined size of batter-like composition that can be individually stored without the need for packaging to contain it in a particular shape, or packaged, although multiple discrete units can be packaged together, as described herein.

Typically, the dimensions and/or shape of the discrete units is (are) selected based upon the final baked good to be prepared from the batter-like composition. For purposes of illustrating the shape of the inventive products, the discrete units will be referred to as "pucks" or individually shaped intermediate farinaceous product units (or intermediate product pucks). The "puck" shaped intermediate farinaceous product units generally have a round shape, such as what a hockey puck possesses. These discrete units can be removed from storage and baked as individual units (for example, to provide muffins or other such baked goods), or combined to provide larger baked products (for example, to provide cakes, coffee cakes, quick breads, brownies or other such baked goods). The intermediate products provide a discrete, generally non-flowable shape that can be retained during handling and storage, until application of elevated temperatures relative to ambient (such as baking temperatures).

Unlike conventional batters, the intermediate farinaceous products of the invention are generally non-flowable and can maintain a discrete shape and/or structure at temperatures above the freezing point of the batter-like composition and below typical baking temperatures. For purposes of discussing the inventive compositions relative to such conventional batters, compositions in accordance with the invention are referred to as "batter-like." This phrase is meant to connote compositions that are non-flowable and capable of maintaining a discrete shape and/or structure at temperatures above storage temperatures (e.g., room temperature and/or below baking temperatures). Conventional batters are typically pourable at room temperature. In contrast, the inventive compositions are non-pourable at such temperatures. At the same time, however, the inventive compositions can possess some features that are comparable to conventional batters, such as water absorption, total moisture content, water activity, and/or pH. The inventive compositions can prepare baked goods possessing a cakey texture that historically has only been achievable from conventional, pourable batters. Despite these similarities to conventional batters (an in particular, the amount of water contained in the compositions), the inventive batter-like compositions can tie up water within the composition in a manner that provides structural features (non-flowable characteristics even at temperatures above storage temperatures) theretofore unachievable with conventional batters. In some aspects, the intermediate farinaceous products are substantially non-sticky and can maintain this property even at temperatures above the freezing point of the batter and below typical baking temperatures. Thus, even if the intermediate products warm to temperatures above freezing, they are still easily handled by a consumer or manufacturer prior to baking. The invention thus provides systems and compositions for providing baked products that typically result from flowable batters, while providing improved handling features that have not been possible with such flowable batters.

The batter-like compositions can be formed into intermediate farinaceous products that can be stored at refrigeration and/or frozen temperatures. For example, farinaceous pucks can be shipped refrigerated or frozen and stored refrigerated or frozen prior to use.

In some aspects, the batter-like compositions can be formed into intermediate farinaceous products that can be stored at refrigeration temperatures. The intermediate products are capable of maintaining structural integrity at refrigeration temperatures (that is, temperatures less than about 65° F. (18.3° C.), or less than about 55° F. (12.8° C.), or less than about 45° F. (7.2° C.), yet above the freezing point of the batter-like composition), providing the consumer with the ability to select any number of discrete units to be baked by manually placing the selected units in or onto a desired baking sheet, pan, cup, or tray. In some aspects, the batter-like compositions can be formed into intermediate farinaceous products that can be stored at refrigeration temperatures in the range of about 30° F. (−1.1° C.) to about ambient temperature, or in the range of about 35° F. (1.7° C.) to about 45° F. (7.2° C.), or in the range of about 38° F. (3.3° C.) to about 45° F. (7.2° C.) for up to 90 days.

Optionally, the batter-like compositions can be formed into intermediate farinaceous products that can provide freezer-to-oven ("FTO") frozen intermediate products. In these embodiments, the frozen intermediate products can be baked without thawing or slacking (allowing the composition to gradually increase in temperature). In some aspects, the FTO intermediate products can be baked without the need for one or more steps of: partially baking the intermediate products prior to freezing, thawing the frozen intermediate products between freezing and baking, and/or slacking the intermediate products between freezing and baking.

After being frozen, intermediate farinaceous products can optionally be thawed at temperatures in the range of about 30° F. (−1.1° C.) to about room temperature (for example, to about 65° F. (18.3° C.)) or in the range of about 35° F. (1.7° C.) to about 45° F. (7.2° C.), or in the range of about 38° F. (3.3° C.) to about 45° F. (7.2° C.). For example, such thawing can be included when the products are not FTO products.

The batter-like compositions can provide baked products that are similar in quality to those prepared either from scratch from conventional batters (for example, pancakes or muffins) or from dry mixes (for example, muffins). As discussed herein, the batter-like compositions can be utilized to prepare a wide variety of baked products; thus, one of skill in the art will readily appreciate that the density of the batter-like compositions and baked specific volume of baked goods prepared from the compositions can vary widely, depending upon the baked product to be prepared.

The batter-like compositions are typically useful for preparing chemically-leavened farinaceous dough products. Baked products that can be prepared from the batter-like compositions can include, for example, muffins, pancakes, brownies, cakes, coffee cake, quick bread, corn bread, funnel cakes, and the like.

Generally, the invention relates to setting agent preparations that typically include a setting agent and liquid (such as water). The novel setting agent preparations provide a water management feature to the inventive batter-like compositions. The setting agent preparations tie up water in a manner that allows the batter-like compositions to retain discrete structure below baking temperatures. The setting agent preparations release the water once baking temperatures are reached, in a manner that allows the batter-like compositions to bake up similar to conventional, flowable batters. The result is baked goods having a desirable cakey texture. As will be described, the invention relates to batter-like compositions including a setting agent preparation, non-flowable intermediate farinaceous products prepared from the batter-like compositions, and packaged intermediate farinaceous products. In its method aspects, the invention relates to methods of forming batter-like compositions, as well as methods for preparing intermediate farinaceous products utilizing the batter-like compositions.

In some aspects, the invention provides generally non-flowable setting agent preparations comprising:
  (a) about 0.25 to about 1.5 weight percent setting agent, the setting agent selected from gums, hydrocolloids, or a combination thereof; and
  (b) about 80 to about 95 weight percent water,
wherein the setting agent preparation is provided at a temperature of about 33° F. (0.6° C.) to about 80° F. (26.7° C.), and wherein the setting agent preparation has a yield value in the range of about 0.2 Ncm to about 3 Ncm at 40° F. (4.4° C.). Optionally, the setting agent can include a protein supplement.

The setting agent can comprise one or more gums, hydrocolloids, or a combination thereof. In some embodiments, the setting agent is gelatin, carrageenan, or a combination of gelatin and carrageenan. The setting agent can be selected to have a melting point, setting point, and/or yield value of a desired level. In some aspects, for example, when the batter-like composition is intended to be stored at frozen temperatures, it has been found useful to select a setting agent such as gelatin. In other aspects, for example, when the batter-like composition is intended to be stored at refrigerated or ambient temperatures, it has been found useful to select setting agents that are hydrocolloids, such as carrageenans. When included, the protein supplement can be selected from dairy protein, egg protein, wheat protein, or combinations thereof. In some aspects, the protein supplement can be selected from caseinate, albumin, whey protein concentrate, nonfat dry milk, buttermilk, or a combination of any two or more of these.

In some aspects, the invention provides batter-like compositions comprising:
  (a) about 20 to about 30 weight percent flour or flour replacement ingredient;
  (b) about 15 to about 30 weight percent sweetener;

(c) about 15 to about 30 weight percent setting agent preparation;
(d) about 6 to about 23 weight percent fat component; and
(e) about 0.4 to about 2 weight percent a chemical leavening system, wherein the setting agent preparation comprises about 0.25 to about 1.5 weight percent setting agent, the setting agent selected from gums, hydrocolloids, or a combination thereof; and about 80 to about 95 weight percent water, and wherein the batter-like composition retains its original discrete shape at temperatures above about 42° F. (5.6° C.). Optionally, the setting agent preparation can include a protein supplement.

In some embodiments, the batter-like composition can have a yield value of about 0.4 Ncm to about 0.8 Ncm at 42° F. (5.6° C.), or a yield value in the range of about 0.5 Ncm to about 0.7 Ncm at 40° F. (4.4° C.). In some embodiments, the chemical leavening system includes an encapsulated chemical leavening agent. The encapsulated chemical leavening agent can be the basic leavening agent, the acidic leavening agent, or both the basic and acidic chemical leavening agents.

In other aspects, the invention provides packaged farinaceous products comprising:
(a) a package comprising a plurality of material sheets contained within a package design; and
(b) a plurality of individual farinaceous products positioned on each material sheet, wherein the farinaceous products comprise flour or a flour replacement ingredient, sweetener, setting agent, fat source, and a chemical leavening system, and a total moisture content in the range of about 16% to about 25%, and wherein the farinaceous products possess a yield value in the range of about 0.4 Ncm to about 0.8 Ncm at 40° F. (4.4° C.), and a yield value in the range of about 0.1 to about 0.2 Ncm at 70° F. (21.1° C.).

In some embodiments, the packaged farinaceous product can have a yield value in the range of about 0.5 Ncm to about 0.7 Ncm at 40° F. (4.4° C.), and a yield value in the range of about 0.13 to about 0.18 Ncm at 70° F. (21.1° C.). In some aspects, the farinaceous products retain their original discrete shape at temperatures above about 42° F. (5.6° C.).

In some method aspects, the invention provides methods for preparing a batter-like composition comprising:
(a) hydrating a setting agent with a liquid, under conditions sufficient to create a generally non-flowable setting agent preparation having a yield value in the range of about 0.2 Ncm to about 3 Ncm at 40° F. (4.4° C.); and
(b) combining the setting agent preparation with flour or flour replacement ingredient, sweetener, fat source, and chemical leavening to form a generally non-flowable batter-like composition.

In some embodiments, the step of hydrating the setting agent comprises heating the setting agent and liquid to form a generally non-flowable (such as a semi-solid) setting agent preparation. Optionally, the hydrated setting agent can be cooled prior to combination with other ingredients of the batter-like combination. In some embodiments, the hydrated setting agent is cooled to a temperature below about 80° F. (26.7° C.). In some embodiments, the setting agent has a hydration point in the range of about 32° F. to about 212° F. (0° C. to about 100° C.). In some embodiments, step (b) further comprises combining humectant. In some embodiments, step (b) comprises combining the setting agent preparation with flour or flour replacement ingredient, sweetener, fat source, and chemical leavening to form a generally non-flowable batter-like composition that retains its original discrete shape at temperatures above about 42° F. (5.6° C.).

In further method aspects, the invention provides methods for preparing an intermediate farinaceous product comprising steps of:
(a) hydrating a setting agent with a liquid, under conditions sufficient to create a generally non-flowable setting agent preparation having a yield value in the range of about 0.2 Ncm to about 0.9 Ncm at 40° F. (4.4° C.); and
(b) combining the setting agent preparation with flour or flour replacement ingredient, sweetener, fat source, and chemical leavening to form a generally non-flowable batter-like composition; and
(c) forming the batter-like composition into discrete, generally non-flowable product units.

In some embodiments, the batter-like compositions are formed into discrete, generally non-flowable product units by extruding the batter-like composition and cutting the batter-like composition to form the product units. The thus-formed product units can retain their discrete shape at temperatures above about 42° F. (5.6° C.).

Products prepared by the described methods are also provided.

For purposes of illustration, use of the batter-like compositions and methods to prepare muffins will be described in detail. Muffins have been selected because these baked goods are typically prepared from dry mixes or from scratch; thus, the advantages of handling and preparation efficiency resulting from the invention can be easily illustrated. Moreover, consumers have certain expectations of muffin products, such as soft, moist product texture and acceptable baked specific volume. Thus, these systems provide the ability to describe the improved organoleptic properties of baked goods prepared from the batter-like compositions and systems.

Thus, in an illustrative embodiment, the invention provides frozen intermediate farinaceous products prepared from a batter-like composition comprising flour, sweetener, leavening agent, water, and sufficient setting agent to maintain the batter-like composition in a discrete product form at desired temperatures, and release sufficient water when the batter-like composition is heated to baking temperatures, thereby allowing the composition to soften (and the frozen composition to "melt") and behave more similarly to a conventional batter at these elevated temperatures. In some embodiments, the setting agent is gelatin. The sweetener can comprise sucrose and corn syrup; in some embodiments, the corn syrup can include both high fructose corn syrup and corn syrup. In some embodiments, the batter-like composition can include emulsifier, a fat source (such as shortening), and/or a gum. In some aspects, a frozen intermediate product can be provided as a freezer-to-oven intermediate product, for example, for preparing muffins. In further aspects, the invention can provide methods of making baked goods, such as muffins, comprising steps of: (a) placing a frozen muffin intermediate product made from a batter-like composition containing gelatin on suitable bakeware (such as a baking pan); and (b) baking the intermediate product on the baking pan directly from its frozen state, at a rate such that sufficient heat would cook the center of the intermediate product but not burn the baked good surface.

These and other aspects and advantages will now be described in more detail.

DETAILED DESCRIPTION OF THE INVENTION

The embodiments of the invention described below are not intended to be exhaustive or to limit the invention to the precise forms disclosed in the following detailed description. Rather, the embodiments are chosen and described so that others skilled in the art can appreciate and understand the principles and practices of the invention.

Throughout the specification and claims, percentages are by weight and temperatures in degrees Fahrenheit unless otherwise indicated.

As used typically in the industry, the term "dough" refers to an intermediate food product that has a gluten based structure. In dough, the gluten forms a continuous dough elastic matrix into which other ingredients can be embedded or can be contained (for example, air). A dough is typically prepared by beating, blending, cutting, and/or kneading, and is often stiff enough to cut into various shapes. Doughs typically are used for low sugar-to-flour ratio products such as breads, biscuits, and the like.

In contrast, "batter" refers to an intermediate food product whose gluten development is purposefully minimized. In general, batters are understood to be less viscous than doughs and to have more free water present. Batters are typically inelastic. Liquid added to make the batter forms a continuous batter medium in which other ingredients can be dispersed. A batter generally cooks into a soft, moist and sometimes crumbly product. A batter is typically prepared by blending, creaming, stirring, and/or whipping, and is generally flowable enough to pour or dispense or squeeze out of a container.

As used herein, discussion of the density of the batter-like composition (the "raw density") will refer to the density of the batter-like composition after it has been mixed. The density of the batter-like composition is typically measured prior to baking, and can be measured either after formation of intermediate product (such as pucks) and prior to storage at refrigerated or frozen temperatures, or after being taken from storage conditions and prior to baking. In contrast, the "baked specific volume" refers to the specific volume of the product after it has been baked, for example, to provide a cooked product, (for example, a muffin or cake).

The batter-like compositions can be stored at refrigeration and/or frozen temperatures. Reference to the general phrase "storage temperatures" herein will be understood to encompass both refrigeration and frozen storage conditions.

In some aspects, the batter-like compositions are formulated to be processed at ambient temperatures and stored at refrigeration temperatures. As discussed herein, "ambient" temperatures generally refers to temperatures in the range of about 65° F. to about 85° F. (about 18.3° C. to about 29.4° C.). In other aspects, the batter-like compositions are formulated to be processed at refrigeration temperatures and stored at frozen temperatures. As discussed herein, "refrigeration" temperatures generally temperatures less than about 65° F. (18.3° C.), or less than about 55° F. (12.8° C.), or less than about 45° F. (7.2° C.), yet above the freezing point of the batter-like composition. The batter-like compositions are capable of maintaining structural integrity for further processing and handling at temperatures below baking temperatures. In some embodiments, the batter-like compositions and intermediate products prepared therefrom are capable of maintaining structural integrity at temperatures below 180° F. (82.2° C.), or temperatures below 150° F. (65.6° C.), or at ambient and refrigeration temperatures such as, for example, temperatures less than about 65° F. (18.3° C.), or less than about 55° F. (12.8° C.), or less than about 45° F. (7.2° C.), providing the consumer with the ability to separate or pick up and place the pucks into or onto a baking sheet, pan, or tray to be baked. Additionally the invention allows the consumer to prepare as few or as many portions as desired, then placing the remainder of the batter-like composition or intermediates back into the refrigerator without risk of spoilage.

In some embodiments, the batter-like compositions can formulated to be stored at frozen temperatures (that is, temperatures less than about 30° F. (−1.1° C.), or less than about 0° F. (−17.8° C.), or less than about −10° F. (−23.3° C.)).

In some aspects, the batter-like compositions are stable for up to at least 30 days, or up to at least at least 90 days, or up to at least 120 days, or up to at least 180 days when stored under frozen conditions. In some aspects, the batter-like compositions are stable for about 6 months at freezing temperatures. Storage temperature may vary throughout storage time. In these aspects, "stable" refers to a batter-like composition that is capable of withstanding at least one freeze/thaw cycle, wherein a freeze/thaw cycle comprises a temperature fluctuation of the batter-like composition between about 32° F. (0° C.) and about 50° F. (10° C.). The stable batter-like compositions are suitable for storage at freezing temperatures without the batter-like composition breaking down by, for example, microbial growth, water accumulation, failure of the leavening agent(s), and the like, and becoming unsuitable for consumption.

Optionally, the batter-like compositions can be formulated to provide freezer-to-oven ("FTO") frozen batter-like products. As used herein, the phrase "freezer-to-oven" is meant to indicate that the batter-like compositions of the invention can advantageously proceed directly from a substantially frozen state to a heated environment for cooking without an intervening step that would be sufficient to at least partially thaw the batter-like composition. In these embodiments, the frozen batter-like compositions can be baked without thawing. In some aspects, the FTO batter-like compositions can be baked without the need for one or more steps of: partially baking the batter-like composition prior to freezing, thawing the frozen batter-like composition between freezing and baking, and/or slacking the batter-like composition between freezing and baking. The batter-like compositions can be capable of sufficient expansion upon cooking, thereby producing final baked products with desirable visual and organoleptic properties. In alternative embodiments, the batter-like compositions can be formulated to include a slacking step prior to baking. Whether the FTO compositions include a slacking step or not, the invention provides batter-like compositions that can be formed into intermediate farinaceous products that are capable of maintaining a discrete shape until the intermediate products reach a desired temperature (for example, baking temperatures).

After being frozen, intermediate products of the invention can optionally be thawed at temperatures in the range of about 30° F. (−1.1° C.) to about ambient temperature, or in the range of about 35° F. (1.7° C.) to about 45° F. (7.2° C.), or in the range of about 38° F. (3.3° C.) to about 42° F. (5.6° C.).

As discussed herein, the inventive farinaceous intermediate products (such as pucks) retain identity as discrete, generally non-flowable units until the products reach a desired temperature. In some aspects, the batter-like compositions and intermediate products prepared therefrom retain identity as discrete, generally non-flowable units (without the support of packaging or containment) at temperatures below a desired temperature. The desired temperature can be an elevated temperature relative to ambient temperatures, for example, about 150° F. (65.6° C.) or greater, or about 180° F. (82.2° C.) or greater, or about 200° F. (93.3° C.) or greater, or about 300° F. (148.9° C.) or greater. In some aspects, the batter-like compositions and intermediate products prepared therefrom can remain substantially non-sticky at temperatures below a desired temperature, which can enhance handleability of the products prior to baking. By "substantially non-sticky" is meant that the compositions and intermediate products can remain handleable without the addition of anti-sticking agents (such as flour). In some aspects, the desired temperature is referred to herein as a "baking temperature." The baking temperature will vary, depending upon the baked product to be prepared. For example, for muffins the baked in an oven, the baking temperature is typically about 350° F. (176.7° C.) to about 400° F. (204.4° C.). For pancakes and waffles, where cooking is conducted on a griddle or other hot surface, the desired or baking temperatures are typically about 375° F. (190.6° C.). Suitable baking temperatures will depend a great deal on the oven characteristics, the intermediate piece size and baking pan characteristics.

The inventive intermediate products are generally non-flowable at temperatures below the baking temperatures. In some embodiments, the consistency of the batter-like compositions and/or the intermediate farinaceous products of the invention are between that typically observed for conventional batters and conventional doughs.

The batter-like compositions include conventional batter ingredients, that is, at least flour, sweetener, a fat component, leavening system, and water. In some aspects, the batter-like compositions can include a flour replacement ingredient. Additionally, the batter-like compositions include a setting agent that allows the batter-like composition to be processed and formed into discrete, generally non-flowable product units (intermediate farinaceous products) that can maintain a desired form and be handled by a consumer, even when the product warms from storage temperatures. Unlike conventional batters, the batter-like compositions can be formed and molded as a solid and maintain a discrete shape and size at refrigeration, frozen, and/or room (ambient) temperatures.

According to the invention, the batter-like compositions include a grain constituent that contributes to the structure of the batter-like composition. A variety of different flours can be used as the grain constituent, and different flours can be selected to give a variety of textures, tastes, and appearances to the final baked product.

Useful flours include, but are not limited to, hard wheat flour, soft wheat flour, corn flour, high amylose flour, rice flour, and low amylose flour. The relative proportions of the types of flours used can be varied as desired.

The batter-like compositions typically include an amount of flour effective to provide structure to the batter-like composition. That is, a batter-like composition includes flour in an amount effective to provide desired consistency. Generally speaking, the amount of flour should not be so high that the batter-like composition is dry and loses its ability to expand. However, the amount of flour should not be so low that the batter-like composition is unsuitably soft and loses its structure as a discrete unit. The batter-like compositions generally contain flour in the range of about 20 to about 40 weight percent, or in the range of about 22 to about 35 weight percent, or in the range of about 22 to about 27 weight percent.

Conventionally, flour is standardized to about 14% moisture. One way to characterize flour is by the protein content. Useful flour(s) can be of conventional type and quality, including cake flour, bread flour, and all-purpose flour. Wheat flour can be useful. In some aspects, other flours conventionally used in the preparation of baked goods can be employed in full or partial substitution of the wheat flour. Traditional cake flour used for layer cakes has about 8% or less protein by weight of the flour. Pastry flour ordinarily has a protein level of about 10%. Other flours such as bread flour generally have higher protein levels in the range of about 11% to about 13% by weight.

In some embodiments, the wheat flour useful to make the batter-like compositions has a protein content in the range of about 7% to about 10% by weight of the flour. An all-purpose flour can also be used. Such all-purpose flour generally comprises a mixture of both hard and soft wheat flours (both high protein level and low protein level flours). Such flours are useful if the average protein content is in the range of about 7% to about 10% by weight.

Optionally, flours can be supplemented with a protein supplement when the protein content of the flour is lower than desired. The use of a protein supplement will often be determined based upon the desired total protein content of the batter-like composition. Protein supplements can contribute to a baked product prepared from the batter-like compositions having a crisp, brown outer surface as well as a tender interior that is moist but not doughy. Protein supplements that provide these characteristics can generally be used. Useful protein supplements include, for example, proteins resulting from amino acids such as alanine, asparagine, aspartic acid, cysteine, glutamic acid, phenylalanine, glycine, histidine, isoleucine, lysine, leucine, methionine, proline, glutamine, arginine, serine, threonine, valine, tryptophan, and tyrosine. Other suitable protein supplements include, for example, α-keratin, collagen, fibroin, sclerolin, myosin, actin, carboxypeptidase, trypsin, ovalbumin, casein, and the like.

In some aspects, the batter-like compositions can include a dairy protein, an egg protein, a wheat protein, or combinations thereof. Illustrative dairy proteins include whey, soy protein, caseinate, buttermilk, buttermilk solids, and nonfat dry milk. Illustrative egg proteins include albumin. Illustrative wheat proteins include those derived from flour or gluten. In some aspects, the protein supplement is selected from caseinate, albumin, whey protein concentrate, nonfat dry milk, buttermilk, or a combination of any two or more of these.

Both chlorinated and unchlorinated flours can be used in accordance with the invention. Selection of chlorinated and/or unchlorinated can depend upon the final application of the batter-like composition. Enzyme inactivated flours can also be utilized.

In some aspects, the inventive batter-like compositions can be formulated to include a flour-replacement ingredient. One illustrative flour-replacement ingredient is described in PCT Application No. PCT/US06/18423 (Li et al., "Batter Compositions and Methods of Preparing and Using Same," filed May 10, 2006). In these embodiments, the flour replacement ingredient can comprise native starch and protein. Optional ingredients include modified starch and/or fiber. The flour replacement ingredient can provide properties to a batter-like composition formed therefrom that were conventionally supplied by the flour ingredient in farinaceous products. At the same time, however, it has been found that the flour replacement ingredient can, in some embodiments, avoid undesirable properties that can be present when flour is present in the formulation, such as undesirable enzymatic reactions.

For such flour replacement ingredient, useful native starch includes, but is not limited to, wheat starch, corn starch, potato starch, tapioca starch or a combination of any of these. In accordance with the invention, native starch is the major component of the flour replacement ingredient, comprising 70% by weight or more, or 75% by weight or more, or 80% by weight or more, of the flour replacement ingredient. As used herein, "native starch" refers to starch recovered in the original form (i.e., unmodified) by extraction from any starch-bearing material. Native starch can be contrasted to modified starch, which has undergone physical or chemical modification.

Optionally, a minor amount of modified starch can be included in the flour replacement ingredient. Modified starch can be included, for example, to modify the viscosity of the overall batter-like composition. Typically, the amount of modified starch included in the flour replacement ingredient is on the order of 25% or less, or 20% or less, or 15% or less, or 10% or less, or 5% or less, based on weight of the flour replacement ingredient. In other aspects, the modified starch can be present in the flour replacement ingredient in an amount of 5% or less, or 4% or less, or 3% or less, or 2% or less or 1% or less by weight, based on total weight of the batter-like composition. As used herein, "modified starch" means that the structure of starch has been modified chemically, thermally, or by other means developed in the future. Such modification can be performed to alter the viscosity of starch in water. One type of modification is gelatinization (thereby forming pregelatinized starch).

For the flour replacement ingredients, suitable protein sources include, for example, gluten, wheat protein, vegetable protein, sodium caseinate, or gelatin, as well as dairy proteins such as milk protein, whey protein and the like, and combinations of any of these. The protein source can be present in an amount of 30% by weight or less, or 20% by weight or less, or 15% by weight or less, based on total weight of the flour replacement ingredient. In some aspects, the protein source can be present in an amount of about 8% by weight or less, or 7% or less, or 6% or less, or 5% or less, or 3% or less, based on total weight of the overall batter-like composition.

It will be readily appreciated that batter-like compositions can often include protein from other sources (i.e., from sources apart from the flour replacement ingredient). For example, protein can be included in batter-like compositions generally in the form of dairy protein, egg protein, wheat protein, or combinations thereof. Illustrative dairy proteins include whey, soy protein, caseinate, buttermilk, milk solids, buttermilk solids, and nonfat dry milk. Illustrative egg proteins include albumin. The egg component can be present as liquid eggs, typically pasteurized liquid eggs or frozen whole eggs. The pasteurized liquid eggs or frozen whole eggs can provide desirable structuring, emulsification, and/or nutritional benefits to the inventive batter compositions. Pasteurized liquid eggs can also provide at least a portion of the total moisture of the batter-like compositions. Useful amounts of liquid eggs include up to about 30% by weight (based upon the total weight of the batter composition), or in the range of about 1% to about 20%, or 5% to about 18%. It will be appreciated that liquid eggs comprise about 75% moisture. In some embodiments, the liquid eggs can be replaced in whole or in part with dried eggs solids, or egg fractions in solid form (for example, egg yolk solids and egg white solids). Illustrative wheat proteins include those derived from flour or gluten. In some aspects, the additional protein is selected from caseinate, albumin, whey protein concentrate, nonfat dry milk, buttermilk, or a combination of any two or more of these.

Thus, in some aspects, the invention provides batter-like compositions including a flour replacement ingredient as described herein, wherein the flour replacement ingredient includes a protein source in an amount of 8% by weight or less, or 7% or less, or 6% or less, or 5% or less, or 3% or less, based on total weight of the overall batter-like composition. The remainder of the batter-like composition can include protein from other sources, for example, in an amount up to about 50% by weight (for example, in angel food cakes), or up to about 40% by weight, or up to 30% by weight, or up to 20% by weight, or up to 10% by weight, based upon total weight of the batter-like composition. In these aspects, then, the total protein content of the batter-like compositions (including protein from the flour replacement ingredient and other protein sources external to the flour replacement ingredient) can be up to about 60% by weight, based upon total weight of the batter-like formulation.

Optionally, the flour replacement ingredient can include a fiber source. Useful fiber sources include, for example, wheat fiber, gum, vegetable gums such as alginates, carrageenan, dextran, furcellaran, pectin, gelatin, gum agar, locust bean gum, gum ghatti, guar gum, gum tragacanth, acacia, gum arabic, xanthan gum, karaya gum, tara gum, cellulose derivatives; soluble and insoluble dietary fiber, wood pulp cellulose, seed husks, oat hulls, citrus fiber, pea fiber, corn bran, soy polysaccharide, oat bran, wheat bran, barley, rice bran, gellan gum, or a combination of any of these.

When included, the fiber source can be present in an amount of 20% by weight or less, or 15% by weight or less, or 10% by weight or less, or 5% by weight or less, based on weight of the flour replacement ingredient. In some aspects, the fiber source can be present in an amount of 5% or less by weight, or 4% or less, or 3% or less, based on total weight of the overall batter composition. Similar to the protein source, the batter-like composition can often include fiber from other sources (i.e., from sources apart from the flour replacement ingredient). For example, fiber can be present in batter-like compositions as part of the setting agent, bulking agents and/or fat-replacer. Thus, the total fiber content of the batter-like compositions can include fiber from the flour replacement ingredient and any of these additional sources, when they are present.

In one exemplary embodiment, the flour replacement ingredient can comprise native starch in an amount of 70% by weight or more, and a protein source in an amount of 30% by weight or less, weight percentages based upon weight of the flour replacement ingredient. Optionally, a minor amount of flour can be included in these embodiments, for example, for organoleptic purposes (e.g., in amounts of 5% or less).

The inventive batter-like compositions generally contain an amount of flour replacement ingredient substantially equal to, or slightly less than, the amount of flour that would be included in a conventional batter composition. To this end, the inventive batter-like compositions can contain flour replacement ingredient in the range of about 12 to about 40 weight percent, or in the range of about 17 to about 35 weight percent, or in the range of about 20 to about 25 weight percent of the batter-like composition. The batter-like compositions can include an amount of flour replacement ingredient effective to provide structure to the batter-like composition. Put another way, a batter-like composition includes flour replacement ingredient in an amount effective to provide desired consistency of the batter-like composition. Generally speaking, the amount of flour replacement ingredient should not be so high that the batter-like composition is dry and loses its ability to expand. However, the amount of flour replacement ingredient should not be so low that the batter-like composition is unsuitably soft and loses its structure as a batter composition.

According to the invention, a sweetener ingredient can be included in the batter-like compositions. The sweetener typically comprises sugar or nutritive carbohydrate sweetener ingredients. Generally, the sweetener can provide sweetness and lower the water activity ($A_w$) of the batter-like composition. The batter-like compositions can include one or more sweeteners; thus, reference to the singular form will be understood to include situations where more than one sweetener is included in the compositions.

In some aspects, the sweetener comprises sugar. Useful sugars include saccharides that can reduce the amount of free water in the composition. Useful sugars include monosaccharides, disaccharides, polysaccharides, and their various degradation products. Illustrative sugars include, but are not limited to, pentoses, xylose, arabinose, glucose, galactose, amylose, fructose, sorbose, lactose, maltose, dextrose, sucrose, maltodextrins, high fructose corn syrup (HFCS), molasses and brown sugar. In some embodiments, the sugar is selected from sucrose, high fructose corn syrup, and maltodextrin.

Because the sweeteners impart sweetness to the baked product, the kind and amount of sweetener(s) is(are) selected to achieve a balance between reducing the water activity of the batter-like composition a sufficient amount to provide microbial stability and obtaining the desired degree and quality of sweetness in the baked product. This can be achieved by balancing both the ratios of various sweeteners to one another and the ratios of sweeteners to water in the batter-like composition.

A useful amount of sweetener in a batter-like composition of the invention includes an amount that provides suitable properties such as sweetness to the batter-like composition, and/or a desired water activity. When reference is made herein to the total amount of sweetener, such amount includes sweetener from all sources. Thus, in some aspects, the invention contemplates batter-like compositions having more than one type of sweetener. Such an amount of total sweeteners can be in the range of about 5% to about 55% by weight of the batter-like composition, or in the range of about 10% to about 40% by weight, the weight percentages based upon the total weight of the batter-like composition.

Another way to characterize a useful amount of sweetener in the batter-like compositions is to observe the relative amount of sweetener to flour. The weight ratio of sweetener to flour is commonly referred to as the baker's ratio. The particular baker's ratio will depend upon various factors, such as, for example, the particular sweetener(s) employed, the final food product, desired baked good attributes, and the like. The baker's ratio of the batter-like compositions can be in the range of about 0.5:1 to about 2.5:1 (about ½ part sweetener to one part flour, to about 2½ parts sweetener to one part flour), or in the range of about 0.5:1 to about 2:1. In some embodiments, the sweetener to flour ratio of the batter-like compositions is in the range of about 0.5:1 to about 1.5:1. Maintenance of the sweetener to flour ratio within these ranges can, in some aspects, provide finished baked goods having the desired eating qualities. In some aspects, the sweetener-to-flour ratio can also impact storage stability of the batter-like compositions.

In some embodiments, at least a portion of the sweetener can be substituted with a high potency sweetener. In some aspects, therefore, up to 100% of the sweetener can comprise a high potency sweetener. In some aspects, inclusion of the high potency sweetener can provide additional sweetness to the final baked product. In some aspects of the invention, a high potency sweetener is a component that provides a sweet taste to the final product, where the component contributes no calories or where the component does contribute calories, but possesses a sweetness potency that is so high that their extremely low usage level imparts no significant impact on the final product's caloric content. In some embodiments, the high potency sweetener is selected so as not to degrade during either storage or more importantly, during the baking step. Thus, high potency sweeteners that are heat tolerant can be useful. One illustrative high potency heat tolerant sweetener is sucralose. The sucralose can be conveniently added in a 25% solution. Sucralose can be added in an amount in the range of about 0.05% to about 0.15%. Other illustrative high potency sweeteners include polydextrose, aspartame, potassium acetylsulfame, saccharine, cyclamate, neotame, alitame, and combinations of any two or more of these. Sugar alcohols that can be utilized include isomalt, lactitol, maltitol, mannitol, sorbitol, erythritol, xylitol, glycerol/glycerin, and combinations of any two or more of these.

When the compositions include one or more high potency sweeteners, the total amount of sweetener included in the composition can be decreased. Thus, in embodiments where the compositions include high potency sweetener, the sweetener can comprise up to 40% of the total batter-like composition, or in the range of about 0.01% to about 40% of the batter-like composition. As a result, one of skill in the art will readily appreciate that bulking agents can be included to compensate for lost weight within the overall composition. Suitable bulking agents include any inert ingredients that do not impact overall textural qualities of the baked product. Illustrative bulking agents include crude fiber that can be composed of cellulose, hemicellulose, lignin, and pectin substances; starches, flour, whey, and the like.

The batter-like compositions can include an edible fat component. A fat component can add richness to the eating properties of the finished baked goods. A fat component can also impact characteristics of the batter-like composition and intermediate product (such as handling and firmness), as well as characteristics of the final baked good (such as texture). The fat component can have beneficial effects on the volume, grain, and texture of the final product, as well as the texture, mouthfeel and/or other organoleptic properties of the baked good.

Useful fat components include shortenings and oils. Animal or vegetable based natural shortenings can be used, as can synthetic shortenings or oils or combinations thereof.

Typical shortenings include fatty glyceridic materials that can be classified on the basis of their physical state at room temperature. Solid shortenings are useful and can provide the advantage of desirable mouthfeel upon consumption. In some embodiments, mixtures of liquid and solid shortenings can be utilized. Such mixes can be fluid or plastic, depending in part upon the level of solid fatty materials.

The solid fatty glycerides can include fatty mono-glycerides and diglycerides of saturated fatty acids having 4 to 22 carbon atoms. The liquid shortening can be animal, vegetable or synthetic oil (such as sucrose polyesters) which is liquid at ordinary room temperatures. Representative of such typical fat sources are palm oil, butter, lard, tallow, coconut oil, palm kernel oil, cottonseed oil, peanut oil, olive oil, sunflower seed oil, sesame seed oil, corn oil, safflower oil, poppy seed oil, soybean oil, canola (rapeseed) oil, babassue oil, and the like and combinations thereof. Other suitable shortening materials and methods of shortening preparation are described in detail in Bailey, "Industrial Oil and Fat Products," ($3^{rd}$ ed. 1964).

Mixtures of the oils described herein can also be used, as can solid fatty materials, such as saturated triglyceride fats. In general, such solid fatty materials can be added to liquid oil, in an amount in the range of about 1.5% to about 25% of triglycerides that are solid at 70° F. (21.1° C.).

In some aspects, at least a portion of the total fat component present in the batter-like composition is included in an emulsion. In some embodiments, the fat component present in the emulsion is a blend of solid and liquid fat components. Such a blend has been observed to provide desirable texture for certain baked goods, such as muffins. The particular amounts of solid and/or liquid fat components present in the emulsion can be determined based upon the particular baked good to be provided. For example, if a more coarse and drier baked product is desired, a larger amount of solid fat relative to liquid fat component can be utilized. In some embodiments, the fat component of the batter-like composition can comprise solid fat alone. It has been observed that inclusion of some liquid fat component can soften the crumb of the baked good and provide a finer texture to the baked good. In still further embodiments, the fat component present in the emulsion can comprise all or substantially all liquid fat. The particular physical state of the fat component in the emulsion, as well as the ratio of solid to liquid fats (when blends are included), can be determined by one of skill in the art upon review of this disclosure.

In some aspects of the invention, any fat component present outside the emulsion of the batter-like composition can serve as a processing aid. In some embodiments, for example, a liquid oil is added to the batter-like compositions as a component separate from the emulsion during processing. The fat component can be present as a liquid. Some processing benefits can be realized from inclusion of such liquid fats as a separate component from the emulsion.

A useful amount of total fat component in a batter-like composition (from all sources) includes an amount that provides suitable properties such as organoleptic qualities and desired textural properties to the finished baked good. Such an amount can be up to about 25% of the batter-like composition, or in the range of about 10% to about 20% by weight. For preparation of a lower fat baked good, the batter-like compositions can include total fat in an amount up to about 10%, or in the range of about 1% to about 10% by weight, based upon the total weight of the batter-like composition.

Optionally, the batter-like compositions can include a fat-replacer, for instance, when it is desired to provide a baked product having less fat. Suitable fat-replacers can be selected to mimic the effects of the fat component in the batter-like composition, for example, by binding water present in the batter-like composition and/or providing fat-like sensory properties in the baked products. The fat-replacer can improve softness, texture, and/or mouthfeel of baked products prepared from batter-like compositions containing the replacer. In some embodiments, the fat-replacer can improve the strength and structure of a batter-like composition, reduce sugar and/or water migration to the surface of the batter-like composition (and intermediate products prepared therefrom), and improve yield.

One type of fat-replacer suitable in accordance with the invention is fiber. Any suitable fiber obtained from a plant source can be utilized in accordance with the invention. An illustrative fiber is citrus fiber. A commercially available citrus fiber that can be useful is Citri-Fi™ (Fiberstar, Inc., Willmar, Minn.).

In some aspects, the batter-like compositions include chemical leavening systems. Chemically-leavenable ("chemically-leavened") batter-like compositions are batter-like compositions formulated to leaven to a substantial extent by the action of chemical ingredients that react to produce a leavening gas. Typically, the ingredients of a chemical leavening system include a basic chemical leavening agent and an acidic chemical leavening agent that react together to produce carbon dioxide, which, when retained by the batter-like matrix, causes the batter-like composition to expand. Chemically-leavenable batters or dough compositions can be contrasted to batter or dough formulations that are substantially leavened due to the action of yeast as a leavening agent, that is, by metabolic action of yeast on a substrate to produce carbon dioxide. Batter-like compositions of the invention can include yeast, either as a flavoring agent, or optionally as a leavening agent.

Basic chemical leavening agents are generally known in the baking arts, and any chemical leavening base that is capable of undergoing a reaction with a chemical leavening acid is suitable for use in the batter-like compositions of the invention. A basic agent may be encapsulated or non-encapsulated. Both encapsulated and non-encapsulated basic chemical leavening agents are generally known and commercially available, and can be prepared by methods known in the baking and encapsulation arts. Exemplary chemical leavening bases, such as sodium bicarbonate (baking soda), ammonium carbonate, ammonium bicarbonate, and potassium bicarbonate, can be used. In some aspects, baking soda can serve as the primary source of carbon dioxide gas in many chemical leavening systems.

Acidic chemical leavening agents are generally known in the baking arts, with examples including sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dihydrate (DCPD), dicalcium phosphate (DCP), sodium aluminum sulfate (SAS), glucono-delta-lactone (GDL), potassium hydrogen tartrate (cream of tartar) as well as a variety of others, and combinations of any of these. Commercially available acidic chemical leavening agents include those sold under the trade names: Levn-Lite® (SALP), Pan-O-Lite® (SALP+MCP), STABIL-9® (SALP+AMCP), PY-RAN® (AMCP), and HT® MCP (MCP). Acidic chemical leavening agents come in a variety of solubilities at different temperature ranges, and may be either encapsulated or non-encapsulated. An illustrative leavening system includes sodium aluminum phosphate and baking soda. (As used throughout this description and claims, unless otherwise noted, amounts of chemical leavening agents and encapsulated chemical leavening agents are given in terms of the amount of active leavening agent not including the weight of any encapsulant or barrier material).

In some embodiments, dimagnesium phosphate trihydrate can be used as the major acidic chemical leavening agent in batter-like compositions. In accordance with these aspects of the invention, an acidic leavening agent consisting essentially of dimagnesium phosphate trihydrate can be utilized in combination with a basic leavening agent in a batter-like composition to provide desirable leavening.

Suitable dimagnesium phosphate trihydrate can be obtained from commercial sources, for example, from Chemische Fabrik Budenheim, KG (Budenheim, Germany, product dimagnesium phosphate, 3-hydrate, fine powder, FCC M52-81, CAS No. 7757-86-0). In some embodiments, the neutralizing value (NV) and/or particle size of the dimagnesium phosphate trihydrate can be relevant in providing acceptable leavening activity. For example, dimagnesium phosphate trihydrate having a relatively fine particle size can be particularly useful. In some aspects, the dimagnesium phosphate trihydrate has a mean particle size of 17 µm or 15 µm or less, or 10 µm or less.

In accordance with some aspects of the invention, a batter-like composition is provided, the batter-like composition comprising a structure-providing amount of flour or flour replacement ingredient; sweetener in an amount effective to provide a water activity of about 0.94 or less; fat source; and a chemical leavening system, the chemical leavening system comprising a basic leavening agent and dimagnesium phosphate trihydrate as acidic leavening agent, the dimagnesium phosphate trihydrate comprising at least about 75% by weight of the acidic leavening agent. In other aspects, the dimagnesium phosphate trihydrate can comprise about 80% or more, or about 85% or more, or about 90% or more, or about 95% or more, or about 100% of the acidic leavening acid. In some aspects, the inventive batter-like compositions include less than about 30% by weight, or less than about 20% or less than about 10% or less than about 5% amorphous dimagnesium phosphate based on weight of the acidic leavening agent.

In accordance with the invention, dimagnesium phosphate trihydrate can be employed as the acid factor in leavening systems in typical application with a carbonate factor. Carbonate factors include any suitable basic materials such as sodium bicarbonate as well as other basic materials such as potassium bicarbonate, amorphous calcium carbonate, ammonium bicarbonate and the like, including those described herein.

Advantageously, dimagnesium phosphate trihydrate can be utilized with unencapsulated basic chemical leavening agents. Thus, in some aspects, the invention provides batter-like compositions that include a leavening system comprising dimagnesium phosphate trihydrate as acidic leavening agent and an unencapsulated leavening base. In accordance with these aspects of the invention, the ability to use a leavening system that does not require encapsulated leavening agents (acidic or basic) can provide cost savings in production of the batter compositions.

In other aspects of the invention, the major leavening activity of the acidic component can be provided by: (1) dimagnesium phosphate trihydrate in combination with dicalcium phosphate, or (2) dicalcium phosphate alone, or (3) dicalcium phosphate in combination with SALP. In these aspects, the invention provides batter compositions comprising a structure-providing amount of flour or flour replacement ingredient; sweetener in an amount effective to provide a water activity of 0.94 or less; fat source; and a chemical leavening system, the chemical leavening system comprising a basic leavening agent and a major acidic leavening agent selected from: (a) dimagnesium phosphate trihydrate in combination with dicalcium phosphate, or (b) dicalcium phosphate alone, or (c) dicalcium phosphate in combination with SALP, wherein the major acidic leavening agent comprises at least 75% by weight of the acidic leavening agent. In other aspects, the major acidic leavening agent can comprise 80% or more, or 85% or more, or 90% or more, or 95% or more, or 100% of the acidic leavening acid.

In accordance with the invention, when acidic leavening agents are included in addition to the major acidic leavening agent, these agents are typically included in minor amounts. The relative amounts of leavening acids, and relative amounts of acidic leavening agents to basic leavening agents, can be calculated based upon the neutralizing value (NV). The NV is calculated by dividing the carbon dioxide carrier by the amount of leavening acid needed for neutralization. The NV calculation can be represented by the following formula:

$$NV = \frac{\text{sodium bicarbonate}}{\text{leavening acid}} \times 100$$

Below are illustrative amounts of carbon dioxide carriers, leavening acids, and neutralizing values for various cooked product types.

| Product type | Sodium Bicarbonate % Flour or Starch Base | Leavening Acids |
| --- | --- | --- |
| Sponge Cake | 1.0-1.5 | SAPP, SALP, MCPM |
| Aerated Batter | 0.6-0.8 | SAPP, MCPM, Baking Powder |
| Waffle | 0.3-0.8 | SAPP |
| Stolen | 1.0-2.0 | SAPP |
| Muffin | 1.6-2.5 | SAPP, Baking powder |
| Pancakes | 1.6-2.0 | SALP, SAPP |
| Layer cake | 0.7-1.0 | SAPP, SALP |
| Angel cake | 1.6-2.0 | SAPP, SALP, Fumaric, MCPM |
| Ready to Cook Batters in accordance with the invention | 0.1-2.0 | DMP, DCPD |

The chemical leavening agents can be present in an amount that provides one or more useful properties as described herein, including stability at refrigeration and/or frozen temperatures, desired refrigerated and/or frozen uncooked specific volume, and desired baked or cooked leavening properties following refrigerated and/or ambient storage. For example, the leavening system can make up about 5% by weight of the batter composition, or in the range of about 0.4% to about 1% by weight of the batter composition, and the relative amount of leavening acid to leavening base can be selected taking into consideration the NV as discussed herein. Illustrative NV for sodium bicarbonate are shown below:

| NV for Sodium Bicarbonate | Leavening Acid |
| --- | --- |
| SAPP | 73 |
| MCPM | 80 |
| SALP | 100 |
| DCPD | 33 |
| DMP3H* | 40 |

The chemical leavening agents can be present in an amount that provides one or more useful properties as described herein, including stability at refrigeration and/or frozen temperatures, desired refrigerated and/or frozen raw specific volume, and desired baked leavening properties following refrigerated and/or frozen storage. For example, the leavening system can make up about 5% by weight of the batter-like composition, or in the range of about 0.4% to about 2%, or in the range of about 0.4% to about 1% by weight of the batter-like composition, and the ratio of leavening acid to leavening base can be in the range of about 1:1 to about 1.5:1.

In some aspects, the amount of chemical leavening system can be included to provide a density in the range of about 0.4 g/cc to about 1.3 g/cc, or in the range of about 0.65 g/cc to about 1.2 g/cc, or about 0.8 g/cc to about 1.2 g/cc during refrigerated and/or frozen storage, as well as a desired baked specific volume upon baking, such as a baked specific volume in the range of about 2.5 cc/g to about 5.0 cc/g.

Encapsulated chemical leavening agents are generally known, and can be prepared by methods known in the baking and encapsulation arts. Illustrative encapsulated chemical leavening agents and encapsulation techniques are described, for example, in U.S. Publication No. 2003/0049358 A1 ("Chemical Leavened Doughs and Related Methods," Domingues, published Mar. 13, 2003).

In some aspects, the batter-like compositions include one or more setting agents (reference to the singular form for purposes of discussion will be understood to encompass compositions that include more than one setting agent as well). Setting agent can be included in the batter-like compositions to set the structure of the batter-like composition, enabling the batter-like composition to be molded, formed, or otherwise manipulated as a pliable solid with the setting agent forming a continuous phase providing structural integrity. Additionally, setting agent can increase moisture content and improve the rheology and crumb texture of the baked product by stabilizing small air cells within the batter-like composition and binding to moisture.

In some aspects, suitable setting agents are thermally-reversible components, in that the agents exhibit phase differences as a function of temperature. For instance, setting agents suitable for use in accordance with the invention can exist in a first phase (such as a solid) within a first temperature range, and a second phase (such as liquid) within a second temperature range. For example, the setting agents can exist as a solid within a temperature range below baking temperatures (such as those encountered during preparation, storage, and handling), but liquid at baking temperatures. This sol-gel conversion is reversible and can be repeated.

Typically, the setting agent swells when hydrated, absorbing several times its own volume of water. Upon activation (by temperature or salt concentration modulation), the setting agent dissolves and forms a gel when permitted to set (for example, by cooling).

Illustrative setting agents include gums and/or hydrocolloids. Many of the gums and hydrocolloids useful in accordance with the invention are polysaccharides. Suitable gums include edible polymeric materials that are soluble in water and can cause a viscous or gelled consistency in foods. Some functional properties of gums include water binding, encapsulating, and structure forming. Useful polysaccharides that are gums include xanthan gum, guar gum, locust bean gum, gum arabic, and the like. Useful polysaccharides that are gums derived from seaweeds include agar, alginates, carrageenans, and furcelleran. Useful polysaccharides that are synthetic gums include microcrystalline cellulose, carboxymethylcellulose, methylethylcellulose, and hydroxypropylcellulose, and the like. When used, gums can be present in an amount up to about 2% by weight of the batter-like composition, or in the range of about 0.05% to about 2% by weight of the batter-like composition.

Suitable hydrocolloids include hydrophilic polymers that can be of vegetable, animal, microbial, or synthetic origin. Hydrocolloids generally contain many hydroxyl groups and can be polyelectrolytes. Some functional properties of hydrocolloids can include water binding, thickening and gelling (thus impacting yield value), emulsion stabilization, prevention of ice recrystallization, and organoleptic properties. Many materials can be described as gums and hydrocolloids. One useful hydrocolloid is gelatin. Suitable gums could also be described as hydrocolloids (such as agar, alginate, carrageenans, carboxymethylcellulose, cellulose, guar gum, gum arabic, locust bean gum, and xanthan gum). Other illustrative polysaccharides that are hydrocolloids include arabinoxylan, curdlan, gellan, β-glucan, pectin, and starch.

The setting agent is selected to provide a structure to a batter-like composition (in addition to structure provided by flour components). As described elsewhere herein, the setting agent is prehydrated, activated (for example, by heat or salt concentration), and allowed to set, thereby forming a setting agent preparation having a gel-like matrix. The matrix can be characterized by its gel strength. According to accepted testing protocol, the gel strength is the weight in grams which it is necessary to apply to the surface of a gel, by means of a piston 12.7 mm in diameter, in order to produce a depression 4 mm deep. Several penetrometer type instruments have been adapted to determine Bloom Strength. Typically, the setting agent is contained in a standard flask at a concentration of 6.67% and is analyzed after it has been allowed to set at a selected temperature for a sufficient amount of time to form the gel matrix. One standard method for the determination of gel strength, based upon the use of the bloom meter, is described by the British Standards Institute (BS 757, 1975). Gel strength can be impacted by the concentration of setting agent. Commercial gelatins, for example, have gel strengths (bloom strength or bloom) between 50 and 300 bloom (g) for a 6.67% gelatin concentration, which increases with time as the gel matures and varies inversely with temperature. In some embodiments, setting agents useful in the invention can have a gel strength similar to that described herein for gelatin.

Another feature useful in characterizing and/or choosing the setting agent is the melting point of a gel prepared from the setting agent. One standard method for the determination of melting point of a gel is described by the British Standards Institute (BS 757, 1975). According to this test, an aqueous gel is prepared to include a setting agent in a concentration of 10%. The melting point is the temperature at which the gel softens sufficiently to allow carbon tetrachloride drops to sink. Maturing time of the gel, concentration of the setting agent within the gel, and the presence of salts in the gel can impact melting point of the gel. For instance, the melting point of a 10% gelatin gel can vary from 80.6° F. to 89.6° F. (27° C. to 32° C.) depending upon the bloom strength of the setting agent and the type of pretreatment of the raw materials. For purposes of this disclosure, this property will be referred to as the "melting point" of a setting agent.

In some embodiments, useful setting agents for the batter-like compositions can be selected to provide a melting point similar to that observed for gelatin. Accordingly, suitable setting agents can be selected that possess a melting point of less than about 113° F. (45° C.), or less than about 104° F. (40° C.), or in the range of about 68° F. (20° C.) to about 104° F. (40° C.), or about 77° F. (25° C.) to about 95° F. (35° C.), depending upon the bloom strength of the setting agent and the type of pretreatment of the raw materials of the setting agent.

In other embodiments, useful setting agents for the batter-like compositions can be selected to provide a melting point that is higher than that observed for gelatin. Accordingly, suitable setting agents can be selected that possess a melting point above about 113° F. (45° C.).

A further feature useful in characterizing and/or choosing a suitable setting agent is the "setting point." For gelatin, the "setting point" indicates the temperature at which a 10% aqueous gelatin solution gels. The setting point of a 10% gelatin solution can vary from 75.2° F. to 84.2° F. (24° C. to 29° C.) depending mainly upon bloom strength and type of pretreatment used.

In some embodiments, useful setting agents for the batter-like compositions can be selected to have a setting point similar to that observed for gelatin. Accordingly, suitable setting agents can be selected to have a setting point in the range of about 68° F. (20° C.) to about 95° F. (35° C.), or about 75.2° F. (24° C.) to about 86° F. (30° C.).

The setting point of a setting agent preparation depends upon its mechanical and thermal history. Mechanical action can delay setting, and the temperature of setting can be higher when the sol is cooled slowly compared with when it is cooled quickly.

Yet another feature useful in characterizing and/or choosing a suitable setting agent is the yield value. Yield value of a setting agent preparation can be measured as described herein. Typically, the yield value of a setting agent or other gel is measured soon after cooling and setting the setting agent/gel, since the gel can become more firm over time (for example, when the gel is allowed to sit for a number of days). As discussed herein, yield value measurements were performed at a selected temperature. Yield value can depend upon such factors as the type of setting agent selected, contribution from the solvent (water), temperature, and pH. Useful setting agents in accordance with the invention can exhibit a yield value in the range of about 0.2 Ncm to about 3 Ncm.

Useful amounts of setting agent in the batter-like compositions are in the range of about 1% by weight or less, or about 0.8% by weight or less, or about 0.6% by weight or less, or in the range of about 0.1% to about 0.6% by weight, based upon the weight of the total batter-like composition. Surprisingly, the setting agent can be included in low amounts relative to the total weight of the batter-like composition, yet provide the benefits described herein.

One illustrative setting agent that is useful is gelatin. Although any suitable gelatin can be utilized, in some embodiments, fish-derived gelatin can be desirable for providing Kosher food products. Useful gelatin according to the invention has a bloom strength in the range of 50-300 Bloom grams, or 200-500 Bloom grams, or 200-400 Bloom grams. The melting point for a 10% gel can vary from 80.6° F. (27° C.) to 89.6° F. (32° C.), depending mainly upon the Bloom strength of the gelatin employed. In some aspects, the setting agent can comprise gelatin having a percentage of gelatin to liquid in the range of about 2% to about 4%.

Suitable gelatin for use herein is commercially available, for example, gelatins having Bloom strengths of 175 A Atlantic Gelatin to 250 A Leiner Davis.

Alternatively, useful setting agents can be selected from polysaccharide gums and/or hydrocolloids. In some aspects of the invention, polysaccharide gums and/or hydrocolloids can provide benefits to batter-like compositions formed therefrom, particularly when the batter-like compositions (and/or intermediate farinaceous products prepared therefrom) are exposed to temperatures above typical frozen storage temperatures, for example, above about 30° F. (−1.1° C.), or above about 40° F. (4.4° C.).

The setting agent (gums or hydrocolloids) is combined with water to form a setting agent preparation, as described herein. The resulting setting agent preparation is a non-flowable, semi-solid, firm material, typically a gel. Generally speaking, gels may be formed in various ways, according to the type of setting agent employed. In gels, polymer molecules in solution behave more or less as random coils, effectively immobilizing a large amount of solvent (water), thereby increasing viscosity considerably. If the polymer concentration is not very low, the individual molecules tend to interpenetrate and form entanglements. This gives the solution some elasticity, but no yield stress. Gelation is caused by formation of intermolecular cross-links, which can be covalent bonds, salt bridges, or microcrystalline regions. The type and extent of interpenetration and/or cross-links can impact the properties of the resultant gel.

Taking gelatin as one example of a setting agent, the setting agent gel formed therefrom is very extensible. Gelatin forms an entropic gel. The gel is also predominantly elastic because the cross-links are fairly permanent (at least at low temperature). Gelatin molecules retain much of their length and produce highly viscous aqueous solutions. Upon cooling, the molecules tend to form intricate cross-linked structures.

When the setting agent comprises a polysaccharide, different gelling behavior can be observed. Unlike gelatin, most polysaccharide chains are fairly stiff. When used to form a gel, the polysaccharides form short gels, very unlike rubber gels. In some aspects, setting agents selected from polysaccharides can be more porous to water, allowing a resulting setting agent preparation to bind more water relative to gelatin. In some aspects, and particularly when the polysaccharide is anionic, the polysaccharide setting agent may bind water more tightly as compared to gelatin. Accordingly, a batter-like composition that includes a polysaccharide setting agent may be capable of retaining non-flowable properties at higher temperatures as compared to gelatin (which may release water more readily at lower temperatures). In some embodiments, polysaccharide setting agents can be utilized to prepare intermediate farinaceous products that retain a discrete shape at temperatures above storage temperatures (e.g., above frozen temperatures, at refrigeration temperatures, and/or even at ambient temperatures). This class of setting agents can thus, in some aspects, provide intermediate farinaceous products that can be stored under a variety of conditions, including refrigerated and/or ambient, without losing structural integrity.

Optionally, the compositions further include one or more humectants. Humectants suitable for use in the compositions can contribute to obtaining a desirable water activity. Humectants suitable for use in the compositions include hygroscopic substances suitable for use as food additives. Humectants can, when included, assist in retaining moist character to baked products produced from the compositions.

Illustrative humectants include sugar and/or nonsugar ingredients that can bind moisture in the batter-like compositions of the invention and include, for example, fructose, dextrose, corn syrup, corn syrup solids, invert syrup, high fructose corn syrup, honey, molasses, maltose, sorbose, mannose, lactose, galactose, sucrose, and the like.

Suitable nonsugar humectants include, for example, glycerin, glycerol, sorbitol, mannitol, maltitol, xylitol, propylene glycol, hydrogenated glucose sugar, sugar ester, dextrin, and combinations of any two or more of these.

It will be appreciated that many of the humectants described herein also provide a sweetening effect in the compositions, and are thus also categorizable as a "sweetener" herein. In some aspects, the invention contemplates that an additional ingredient can be added to provide the water-binding features of a humectant, in addition to the sweetener component described herein.

Useful amounts of humectant are in the range that provides a desirable water activity. Useful amounts of humectant are in the range of about 0.5% to about 15%, or about 1% to about 10%, or about 1.5% to about 8%.

Optionally, the batter-like compositions can include starch. Starch addition can be used to influence a variety of product attributes including yield value, finished baked goods' volume and texture. The starch used can be any of the common food starches, for example, potato starch, corn starch, wheat starch, rice starch, barley starch, oat starch, tapioca starch, arrowroot, sago starch, and the like. Modified starches and pregelatinized starches can also be used. If present, the added starch ingredient(s) can comprise about 0.1% to about 10% of the batter-like composition, or about 1% to about 8% of the batter-like composition. When the inventive batter-like compositions include a flour replacement ingredient, it is understood that these values are in addition to the starch included in the flour replacement ingredient.

Optionally, the batter-like compositions can include an egg component. The egg component can be present as liquid eggs, typically pasteurized liquid eggs or frozen whole eggs. The pasteurized liquid eggs or frozen whole eggs can provide desirable structuring, emulsification, and/or nutritional benefits to the batter-like compositions. Pasteurized liquid eggs can also provide at least a portion of the total moisture of the batter-like compositions. Useful amounts of liquid eggs include up to about 30% by weight (based upon the total weight of the batter-like composition), or in the range of about 1% to about 20%, or about 5% to about 18%. It will be appreciated that liquid eggs comprise about 75% moisture. In some embodiments, the liquid eggs can be replaced in whole or in part with dried eggs solids, or egg fractions in solid form (for example, egg yolk solids and egg white solids).

An antimycotic agent can optionally be incorporated in the batter-like composition to enhance microbial stability. Useful agents include sorbic acid and its derivatives such as sodium or potassium sorbate, propionic acid and its derivatives, vinegar, sodium diacetate, monocalcium phosphate, lactic acid, citric acid, and the like. These agents can be present in an amount effective to inhibit the growth of undesirable microbes such as yeasts and/or molds. When present, the antimycotic agent(s) can be included in the amount up to about 0.2% by weight, or in the range of about 0.1% to about 0.2% by weight. The amount included will typically be selected to provide an antimycotic effect, while avoiding or minimizing any noticeable off-taste to the batter-like composition.

Optionally, the batter-like compositions can include a variety of additional minor ingredients or "conventional additives" suitable for rendering finished baked goods prepared therefrom more organoleptically desirable. Such optional dry mix components include anti-oxidants, salt, coloring agents, flavoring agents, egg solids, milk solids, preservatives, gluten, spices, flavor chips, and particulates (such as nuts, fruit pieces, and other edible inclusions). Flavor chips can include chocolate, mint chocolate, butterscotch, peanut butter chips, and mixtures thereof. The flavor chips can be coated with topical film to minimize moisture migration such as with a hard fat or with edible shellac. Inclusions can include fruit (such as berries), nuts, and the like. Optionally, the inclusions (such as fruit pieces) can be coated with starch or cellulose gum, for example, to reduce or minimize bleeding of the fruit color into the batter during mixing and/or depositing. If present, such optional components collectively comprise about 1% to about 15% of the batter-like composition.

A further class of optional ingredients for the batter-like compositions is an emulsifier component. When included, the emulsifier component can include one or more emulsifiers. Emulsifiers can be nonionic, anionic, and/or cationic surfactants that can influence the texture and homogeneity of the batter-like composition, increase stability of the batter-like composition (including freeze/thaw stability), and/or improve eating quality of the finished product. In some aspects, the shortening component provides a convenient carrier for addition of emulsifiers to the batter-like composition. Such emulsifiers can aid the realization of baked goods with improved grain structure and texture. The emulsifier can also be useful to maintain the emulsion integrity of the batter-like composition over extended storage (such as extended room temperature storage).

All or a portion of the emulsifier component can be admixed with the shortening component. Some emulsifier(s), such as monoglycerides, have relatively higher melting points than the fat component. Consequently, as more emulsifier is added to the fat component to form an emulsified fat component, its melting point and hardness increases. As the increased emulsifier levels "harden" the fat component, blending with other ingredients of the batter-like composition can become more difficult. Thus, in some embodiments, a first portion of the emulsifier can be preblended with the fat source, a second portion can be added in its dry powder form, while a third portion can be admixed in liquid form.

When included, the emulsifier can comprises up to about 25% of the shortening component, or about 5% to about 15%, or about 10% to about 15%, or about 15% to about 25% of the shortening component. When preblended with the fat component to form an emulsion, the emulsion can contain at least about 2% to about 10% by weight of the fat source of the emulsion, or about 3% to about 5% of the emulsion. In further aspects, the amount of emulsifier in the batter-like composition can be in the range of about 0.3% to about 10%.

Emulsifiers can be prehydrated in an aqueous dispersion and added to the batter-like composition. They can also be part of an emulsion or dispersion with or without a fat component. Generally useful emulsifiers are partially esterified polyhydric compounds having surface-active properties. This class of emulsifiers includes among others, mono- and diglycerides of fatty acids, such as monopalmitin, monostearin, monoolein, and dipalmitin; partial fatty esters of glycols, such as propylene glycol monostearate and monobehenate; glyceryl-lacto esters of fatty acids; ethoxylated mono- and diglycerides; higher fatty acid esters of sugars, such as the partial palmitic and oleic acid esters of sucrose; and phosphoric and sulfuric acid esters, such as dodecyl-glyceryl ether sulfate and monostearin phosphate. Other examples include the partial esters of hydroxycarboxylic acids, such as lactic, citric, and tartaric acids with polyhydric compounds, for example, glycerol lacto-palmitate, and the polyoxyethylene ethers of fatty esters of polyhydric alcohols, such as a polyoxyethylene ether of sorbitan monostearate or distearate. Fatty acids alone or esterified with a hydroxy carboxylic acid, for example stearoyl-2-lactylate, are also useful.

The total amount of emulsifier(s) in the batter-like compositions can be adjusted such that suitable organoleptic properties are obtained. That is, the total level of emulsifiers in the batter-like compositions can be adjusted such that the final baked goods prepared from the batter-like compositions have a rich mouthfeel, a smooth texture and a baked specific volume as described herein. Some illustrative baked specific volumes include about 0.2 g/cc to about 0.4 g/cc (for pancakes); about 0.3 g/cc to about 0.6 g/cc (for cakes); and other appropriate baked specific volumes based upon the final baked good to be prepared.

One illustrative minor ingredient that can be added to the composition is calcium acetate. Calcium acetate can be employed as a thickening agent, texture modifier, a preservative, and/or as a buffer for pH.

In some aspects, for example, when the batter-like compositions are formulated for refrigerated storage conditions, the compositions can include preservatives, such as anti-microbial agents commonly used in dough and/or batter formulation.

In some aspects, the batter-like compositions have a water absorption that is comparable to conventional batters. The water absorption can be calculated based upon the water added to dry materials in the product ($H_2O$/dry matter=Absorption).

In some aspects, the batter-like compositions can have a total moisture content comparable to that of conventional batters. In some exemplary embodiments, the total moisture content of the batter-like compositions can be higher than that of conventional batters. The total moisture content includes water provided with or associated with the various essential and optional ingredients. For example, total moisture includes the moisture associated with flour, starch, cocoa and especially liquid eggs. The total moisture can be determined by vacuum oven drying the batter-like compositions herein. Unlike conventional batters, however, the compositions can tie up water within the composition in a manner that provides a generally non-flowable intermediate product (such as a puck) that is capable of retaining its integrity until the product is exposed to baking temperatures, at which time water is freed and the composition behaves like a conventional batter. The total moisture content of the batter-like compositions can be in the range of about 16% to about 45% or about 17% to about 40%, or about 25% to about 40%.

Ingredients and concentrations can be selected to provide batter-like compositions having a water activity comparable to conventional batters. Batter-like compositions can be formulated to have a water activity in the range of 0.80 to 0.928. As described herein, water activity can impact the shelf life of batter-like compositions. Water activity can also be used to determine the lower limit of available water for microbial growth. In addition to influencing microbial spoilage, water activity can play a role in determining the activity of enzymes and vitamins in foods and can have an impact on the food's color, taste, and/or aroma. In some aspects, formulation of certain water activity values can provide a balance between microbial shelf stability and handling characteristics of the compositions.

The batter-like compositions provide a product category that is distinct from conventional batters and doughs, yet possesses some desirable characteristics of each. For example, the compositions can provide water absorption, water activity and pH that are comparable to conventional batters, yet provide structural features (for example, generally non-flowable and substantially non-sticky characteristics even at temperatures above storage temperatures) that have heretofore been unachievable with batters. The batter-like compositions surprisingly possess the capability of being molded and formed during processing enabling the manufacturer to process the batter-like composition as a solid/semi-solid material. The solid or semi-solid nature of the batter enables the batter-like composition to be processed into discrete units at ambient temperatures maintaining a discrete form (such as a puck), while retaining qualities typically associated with batter compositions. As mentioned elsewhere herein, traditional batters are considered to be less viscous than doughs, and are typically flowable. At the same time, however, batters typically possess a higher level of free water relative to doughs. The inventive batter-like compositions include the higher level of free water, yet are capable of retaining a discrete form that is easily handled by a consumer and is stable in storage for extended periods at a variety of temperatures.

When held at refrigerated or ambient temperatures for extended periods of time (for example, weeks) it can be useful to actively remove oxygen from the product and package environment to prevent or reduce enzymatic discoloration of the batter-like composition. Discoloration can be the result of native wheat flour polyphenol oxidase activity that oxidizes phenolic compounds into colored pigment. Oxygen can be removed from the package/product system by a variety of techniques, including, for example, 1) vacuum packaging, 2) providing a modified packaging atmosphere of nitrogen, carbon dioxide or combination thereof, or 3) actively removing oxygen using oxygen absorbing sachets (metal based oxidation reaction) or enzymatically removing oxygen by adding glucose oxidase to the batter-like composition. A further surprising property of the batter-like compositions is that the batter-like composition can be exposed to vacuum at non-frozen temperatures without loss of structural integrity. Without intending to be bound by a particular theory, it is currently believed that, upon exposure to vacuum, the elastic nature of the matrix of the batter-like composition enables the composition to stretch to accommodate gas cell expansion and, moreover, snap back to its original conformation upon release of the vacuum. This can provide processing cost savings compared to the cost of having to freeze the batter-like composition or intermediate products prior to exposure to vacuum.

The batter-like compositions are formulated to retain a discrete shape, such as a puck, during storage and handling prior to baking. Upon exposure to heating temperatures during the baking/cooking process, however, the batter-like compositions become flowable and behave like a traditional batter. In some aspects, the batter-like compositions provide significant flexibility in the type of baked goods that can be prepared therefrom. For example, batter-like products (such as in the form of pucks) can be utilized to prepare muffins, as described herein. In other illustrative embodiments, multiple batter-like products (such as pucks) can be placed adjacent each other (for example, touching, in a side-by-side manner and/or stacked on top of each other) at the time of baking, to provide a cake, brownie, or other similar baked good. In these aspects, upon application of heat during the baking process, the multiple batter-like products become more flowable at baking temperatures and can combine to form a final baked good that is a combination of the individual batter-like pieces. Thus, the batter-like units are no longer discrete upon baking in these aspects. The final baked product can therefore be a unitary baked good that can be subsequently portioned (for example, by cutting), as with traditionally-prepared cakes and/or brownies.

The size and dimensions of the individual batter-like units can be selected based upon the final baked product. It will be readily appreciated that the particular size and dimensions are not critical. In some aspects, intermediate products comprising individual pieces can be from about 0.5 ounces to about 4 ounces in weight or larger. In some aspects, the batter-like compositions can form discrete product units (such as pucks) in a size of approximately 2 ounces. This particular size portion has been found useful for preparing muffins. Additionally, the 2-ounce size can provide packaging and manufacturing efficiencies. Moreover, the 2-ounce pucks are easily combined to provide larger muffins, cakes, coffee cakes, brownies, and the like.

Embodiments of pucks according to the invention are provided in frozen or refrigerated form, and packaged for shipping to the consumer. In some embodiments, the individual products are provided as freezer-to-oven batter-like products, where the consumer does not have to thaw the batter-like products prior to placing the product pieces into the oven for baking. In these embodiments, the consumer can simply remove the product pieces from the freezer and place the product pieces directly into the oven. These embodiments can provide advantageous time savings to the consumer, who does not have to thaw the individual product pieces prior to baking.

In some aspects, the batter-like compositions of the invention provide desirable viscoelastic properties, such as yield value. In some aspects, the batter-like compositions possess sufficient yield value to provide products that are capable of maintaining product integrity during handling, storage, and prior to baking, yet provide a suitable flowable composition upon application of baking conditions (such as heating). The batter-like compositions are suitably firm. In some aspects, the "firm" property of the batter-like composition can be described as a form that is not easily disrupted and exhibits some resistance to applied pressure, such that intermediate products produced from the batter-like compositions can be molded and formed to maintain a desired shape.

In some aspects, the setting agent can be prehydrated at elevated temperatures, and allowed to set, thereby providing a setting agent preparation. Optionally, the setting agent can be cooled before and/or during the setting step. In one example, the setting agent preparation comprises water/gelatin/protein supplement that exhibits a yield value (at 40° F. (4.4° C.), measured by a Haake viscometer) in the range of about 0.2 Ncm to about 3 Ncm (Newton centimeter), or in the range of about 0.3 Ncm to about 1 Ncm, or in the range of about 0.3 Ncm to about 0.85 Ncm. Similar viscosities can be exhibited by setting agent preparations formulated to include other setting agents described herein. The yield value of the setting agent preparation can vary depending upon such factors as the amount and type of setting agent selected for the application.

This setting agent preparation, in turn, can be added as a raw material ingredient into the batter-like compositions. The prepared batter-like compositions include the setting agent as a continuous phase throughout the composition, thereby conferring the beneficial properties described herein to the composition. This continuous phase of setting agent throughout the batter-like compositions allows the compositions to exhibit generally non-flowable properties at temperatures below baking temperatures, yet flowable properties typically associated with conventional batters upon application of baking temperatures.

In further aspects, the batter-like compositions can have a density in the range of about 0.78 g/cc to about 1.2 g/cc, or in the range of about 0.9 g/cc to about 1.2 g/cc. The density can be varied depending upon what final baked good is desired. Illustrative densities for batter-like compositions include the following: 0.78 g/cc to 0.8 g/cc (cakes); 1 g/cc to 1.1 g/cc (muffins); 1 g/cc to 1.04 g/cc (pancakes). Other attributes of the batter-like compositions can be comparable to conventional batters, such as pH and water activity. Generally speaking, the pH level of batter-like compositions can impact stability and leavening capacity of the compositions as well. Illustrative pH ranges for batter-like compositions of the invention are relatively neutral, in the range of about 6.0 to about 8.0, or about 6.6 to about 7.4. Illustrative water activity for the batter-like compositions can be about 0.95 or less, or about 0.94 or less, or in the range of about 0.928 to about 0.8. The batter-like compositions thus can exhibit some properties that are comparable to conventional batters, yet additional properties heretofore unavailable for such conventional batters.

Batter-like compositions of the invention can generally be prepared by preparing a setting agent preparation, combining the setting agent preparation with sugars and fats, then combining dry ingredients to form a batter-like composition, and forming the batter-like composition into discrete units (pucks). The discrete pieces can then be refrigerated or frozen for storage until baking. Forming the setting agent preparation allows the setting agent matrix to set up, which in turn can provide the desired level of structural integrity to allow intermediate products formed from the batter-like compositions to maintain discrete unit form.

The setting agent preparations can provide a number of advantages during formulation of the batter-like composition. Setting agent preparations include setting agents, such as gums or hydrocolloids, that are commercially available. Moreover, the setting agent preparation, which involves a minimal number of process steps, can be treated as a raw material (ingredient) during formulation of the batter-like compositions. Once prepared, the setting agent preparation can be stored in volumes until such time as the batter-like compositions are intended to be formulated. This can provide cost and time efficiencies during formulation of the products.

The setting agent preparation involves prehydration and setting of the setting agent. In some aspects, the setting agent is prehydrated at an elevated temperature, then allowed to "set," thereby forming a setting agent preparation. The elevated temperatures for prehydration can be determined based upon the particular setting agent selected for use. For example, when the setting agent comprises gelatin, the temperature range for prehydration (hereafter referred to as the "hydration point") of the gelatin can be about 32° F. to about 212° F. (0° C. to about 100° C.), or about 75° F. to about 200° F. (23.9° C. to about 93.3° C.), or about 125° F. to about 175° F. (51.7° C. to about 79.4° C.). The hydration point is the temperature at which the setting agent dissolves. Typically, prehydration of the setting agent is accomplished under high sheer agitation, to allow sufficient mixing of the water, setting agent, and any other optional ingredients that can be mixed therewith. Such optional ingredients can include ingredients that should be prehydrated (such as preservatives). In some embodiments, protein supplements (such as nonfat dry milk) can be mixed with the setting agent and water.

Once hydrated and sufficiently mixed, the setting agent is permitted to "set." Such setting step can be accomplished by exposing the hydrated setting agent to an activation temperature and/or salts. When the setting step involves temperature modulation, the setting agent is typically cooled to a desired temperature that allows the setting agent to assume a more solid form. The temperature range will typically depend upon the particular setting agent selected. For example, when the setting agent comprises gelatin, such setting temperature can be in the range of refrigeration temperatures, such as about 30° F. to about 45° F. (−1.1° C. to about 7.2° C.).

When the setting step involves addition of salts, the particular type of salt provided will be determined based upon the setting agent selected. Illustrative setting agents according to these embodiments include calcium chloride ($CaCl_2$), or other chelating agents that are capable of exchanging ions.

Once prepared, the setting agent preparation is present in a solid, generally non-flowable, firm state. In some aspects, this generally non-flowable state can be characterized by measuring the yield value of the setting agent, as described herein. The solid, generally non-flowable state is sufficiently firm to allow the setting agent to be molded, sheeted, or otherwise processed as a solid or semi-solid raw material ingredient in the batter-like compositions described herein.

Illustrative setting agent preparations can have the following formulation:

| Ingredient | Useful ranges (weight percent) |
| --- | --- |
| Water | 80-95 |
| Setting agent | 0.25-1.5 |
| Other components | up to 20 |

In one illustrative embodiment, a setting agent preparation is prepared as follows. In a first stage the water is heated to a temperature in the range of about 150° F. to 160° F. (65.6° C. to about 71.1° C.), and the setting agent is then added and mixed until suitably hydrated. In a second (optional) stage, the additional water hydrating components can be added and mixed for a suitable time to achieve hydration of these components.

Combination and blending of the components of the setting agent preparation can be performed in any suitable blending equipment for mixing batters or doughs, such as mixers available from Breddo Likwifier (Kansas City, Mo.), which include a heating component (for example, a steam jacketed kettle). Components are heated within the kettle to a temperature in the range of about 150° F. to about 180° F. (65.6° C. to about 82.2° C.), or in the range of about 160° F. to about 180° F. (71.1° C. to about 82.2° C.), which is sufficient to hydrate the components.

Once set, the setting agent preparation can be combined with sugar, fat source, and dry ingredients to formulate a batter-like composition according to the invention. Typical batter-like compositions comprise a setting agent preparation in an amount up to about 30% by weight, or in the range of about 10% to about 30%, or in the range of about 15% to about 18% by weight. To combine the setting agent preparation and dry ingredients, the setting agent preparation can be transferred to any suitable mixing equipment, such as a SIGMA™ mixer. The dry ingredients would typically include conventional ingredients for batters, as described herein. One illustrative formulation for batter-like compositions is as follows:

| Ingredient | Useful ranges (weight percent) |
| --- | --- |
| Flour or flour replacement | 20-30 |
| Sweetener | 15-30 |
| Setting agent preparation (inc. water) | 15-30 |
| Fat component | 6-23 |
| Leavening system | 0.4-2 |
| Flavoring ingredients | 0-20 |
| Minor ingredients | 0-13 |

Typically, all the dry ingredients are blended with the fat source using a ribbon blender. The combined ingredients are then combined with the setting agent preparation and mixed for a time and speed sufficient to provide a mixed batter-like composition.

The formed batter-like compositions provide unique compositions that are capable of being molded, formed, and/or cut during formation of intermediate products (such as pucks). This is in contrast to conventional batters, which are typically flowable (and thus not capable of being molded, formed or cut) and are typically deposited into containers or liners for packaging.

Generally, for commercial, or mass manufacturing, the batter-like composition is mixed in large volume mixers and portioned on equipment that forms individual product pieces (such as pucks) that can be optionally frozen and packaged, or packaged and refrigerated, to be baked at a later date. The batter-like compositions can be segregated into individual sized portions, referred to herein as "intermediate products." The batter-like compositions can be mixed, for example, by batch or continuous processes. The intermediate products can be formed by portioning, sheeting, or extrusion processes as are known in the art.

In one aspect, the batter-like composition can be sheeted using traditional dough sheeting equipment, due to the increased yield value of the composition. Pucks or other discrete shapes can be cut from the sheet during further processing.

In some aspects, the batter-like compositions described herein can be extruded using any appropriate extruder typically utilized for extruding dough. Extruders generally involve one or more screws that are rotated to propel the dough toward the die. The extruder can include sections with multiple screws and other sections with a single screw. If there is more than one screw, rotation of the screws mixes the dough as well as propels the dough forward. Generally, the screw is surrounded by a barrel that holds the dough under pressure as it moves toward the die. The extruder does not necessarily need a screw, and other implements such as paddles can be used to move the dough and to force the dough through the die under pressure. For example, conventional single screw food extruders or twin screw extruders can be used to mix and form intermediate products by extruding the batter-like compositions of the invention. Combination extruder devices that utilize single screw and twin screw components are also contemplated.

According to one technique, the product pieces can be extruded from a die, cut to length, and deposited in rows on conveyors or continuous sheets of substrate (such as paper) in varying numbers depending upon the size of the pucks. Generally, these sheets are carried by conveyors and the pucks can be subsequently cooled (and optionally frozen) on the sheets, and the sheets can be cut for packaging. Generally, for the commercial consumer the hardened pucks can be packaged on the cut sheets as bulk product in cartons for sale to the customer. For the household consumer, it can be desirable to package the pucks in smaller, more convenient packages, such as on paperboard and/or in a container (such as a muffin tray for pucks formulated to provide muffin products when baked). When it is desirable to store the pucks in a refrigerated format, the above methods can be followed, with substitution of refrigeration storage conditions for frozen.

In another technique, once the batter-like composition has been sufficiently formulated and mixed, the composition can be collected in a suitable collection device or hopper. Once a desired amount of batter-like composition has been collected, it can be fed to a supplying device to form the product pieces. Various devices can be used to form the individual product pieces, such as known or developed extruders, depositors, formers, and the like. Such extruders can include cutting wire or knife that passes beneath each die at repeated time intervals, thereby slicing off a short cylindrical (or otherwise shaped) segment of the batter-like composition, representing an individual product piece. As batter-like composition is extruded from a die, paper of indefinite length can be fed onto a conveyor belt that passes beneath the die. The belt can be raised close to the die to allow the batter-like composition to contact the paper and the height of the puck of batter-like composition is established. It is about the time the belt begins to be lowered from the highest position, that the wire or knife is passed through the batter-like composition to cut and form the individual puck. The cutting wire is lowered and retracted below the advancing batter-like composition in preparation for the next cut. The die can be arranged to cut a single puck of batter-like composition for each wire stroke, typically used in a lab development process, or, have many openings in a row to produce numerous pucks during each wire stroke.

One machine that can be used to form pucks of the batter-like composition according to the invention is a wire cut machine produced by APV Baker, Inc. of Goldsboro, N.C. Other machines and methods that can be used are described in commonly owned U.S. Pat. No. 6,715,518 (Finkowski et al., Apr. 6, 2004) and U.S. Pat. No. 6,561,235 (Finkowski et al., May 13, 2003), as well us U.S. Pat. No. 7,067,167 B1 (Damsgard, issued Jun. 27, 2006).

In still further embodiments, the product pieces can be formed in desired shapes, such as pucks, by compressing the batter into cavities in a die. In one embodiment, the product piece formation process is carried out in a continuous process system, whereby cavities in a rotary head are filled by batter-like composition to conform the batter-like composition to a desired shape. After the desired shape is obtained, the individual product pieces are released, ejected or discharged from the cavities by any suitable device, such as by a plunger, piston, air blast, or the like. After the product pieces are discharged from the cavities, the cavity is in one embodiment returned, optionally by rotation of a rotary head, to a position for initiation of a new filling cycle. The discharged pieces are conveyed to a packaging station in a conventional manner.

The intermediate products can either be filled or unfilled. In some embodiments, the extruder is fitted with a filling pump, such that batter-like composition reaching the die surrounds a filling and forms a coextrusion. Coextrusion is well known in the art. The relative amount of filling and batter-like composition can be adjusted by the relative speed of the extruder screw and the flow rate of the filling. When a filling is used, a structure of the batter-like composition surrounding the filling exits from the die during the extrusion process. The shape and size of the intermediate product depends on the shape and size of the die. The filled intermediate product can be cut or otherwise separated to a desired length. Once cut, the intermediate product can optionally be secured, for example by crimping, at one or both ends. The intermediate product can be secured at both ends to seal the filling within the intermediate product.

In some aspects, the intermediate product pieces can be formed using extrusion dies conventionally utilized for extruding dough. One suitable extrusion die is described in U.S. Pat. No. 5,620,713 (Rasmussen, Apr. 15, 1997). As described therein, a die can include an inner die and an outer die. The inner die is formed in a desired shape that represents an item of interest, such as an animal, toy, or other identifiable object, and the outer die has an opening surrounding the inner die. The batter-like composition can be extruded through each of the dies simultaneously. The batter-like composition for the inner die can have a different indicia, such as color or other visually identifiable characteristic from the batter-like composition extruded through the outer die.

In an alternative embodiment, the batter-like composition portion of the intermediate product can be extruded to create a first intermediate piece for subsequent deposition of a filling thereon. The filling on the first intermediate piece is then optionally enclosed by folding the first intermediate piece or laminating the filling on the first intermediate piece with a second intermediate piece, followed by securing the intermediate pieces together, for example by crimping or the like, to seal the filling inside the intermediate product.

The filling, if any, can be a raw or cooked food component. The filling can have a uniform consistency or a chunky consistency. In some embodiments, the filling is a highly viscous liquid, suspension or pseudoliquid, for example, a flowable mixture of particulates and/or liquid that may not normally be a liquid or a suspension. In some aspects, the material is highly viscous such that it will not flow immediately through any imperfection in a covering formed by the batter-like composition or out from the ends of seams of the intermediate product when cut and crimped after exiting the extruder.

The filling can be made from any type or types of food ingredients, including savory or sweet ingredients. Examples of savory ingredients include but are not limited to meat, vegetable, and dairy ingredients. Examples of sweet ingredients include but are not limited to fruit or icing ingredients. Both savory and sweet ingredients may further include spices, herbs, flavoring agents, fats, and the like. The filling can further include such ingredients as preservatives and consistency modifiers such as emulsifiers and thickening agents.

In some aspects, the batter like composition can be sheeted to provide intermediate products as discrete units. Batter-like compositions can be handled in individual pieces for example, or as a continuous sheet. The batter-like compositions can be sheeted on a continuous or reversible sheeter, as are well known in baking arts. Sheeting can be utilized to provide the batter-like composition with a suitable thickness, which can depend upon such factors as the desired size and/or configuration of the intermediate product, the final baked goods to be prepared from the compositions, and the like. After completion of sheeting, the batter-like composition can be rolled and/or shaped to provide the intermediate product.

The above-described equipment and methods for forming the pieces are known in the baking arts for forming conventional bread doughs and cookie doughs. In some aspects, it can be advantageous that these known techniques can be applied for the batter-like compositions, since existing equipment can be utilized to prepare the compositions and products.

Typically, intermediate products comprising individual pieces are from about 0.5 ounces to about 4 ounces in weight, or about 2 ounces in weight. Embodiments of pucks according to the invention are provided in frozen or refrigerated form, and packaged for shipping to the consumer. In some embodiments, the individual products are provided as freezer-to-oven batter-like products, where the consumer does not have to thaw the batter-like products prior to placing the product pieces into the oven for baking. In these embodiments, the consumer can simply remove the product pieces from the freezer, place the pieces in or on suitable bakeware (such as a baking sheet, pan, tray and the like), and place the bakeware containing product pieces directly into the oven. These embodiments can provide advantageous time savings to the consumer, who does not have to thaw the individual product pieces prior to baking.

Advantageously, intermediate products in accordance with the invention do not require bakeware that provide side containment of the batter-like composition as it is baking. Thus, in some aspects, the inventive intermediate products can be placed on a baking tray or other bakeware lacking side containment. The intermediate products of the invention can retain their discrete shape above storage temperatures and up to baking temperatures. At baking temperatures, the intermediate products can bake up into a suitable baked good, such as a muffin-like cookie or muffin top, without requiring additional structural support from the bakeware. Thus, a wide variety of bakeware can be utilized to prepare baked goods with the intermediate products, since the products do not require, for example, muffin tins or the like to retain shape upon baking.

The compositions as described herein can provide superior handling properties both for the manipulation steps required of a manufacturer for placing the batter-like compositions in the various formats as described herein, and at the same time for manipulation of the product pieces by the intermediate consumer who will bake the batter-like compositions. The consumer who will bake the batter-like compositions can prepare a wide variety of flavors of product. For example, in some aspects, the consumer can combine intermediate products that include a selected type of flavoring agent and/or inclusion (for example, blueberry) and intermediate products that include a different selected type of flavoring agent and/or inclusion (for example, cranberry). In one such illustrative embodiment, one or more blueberry intermediate products can be placed adjacent one or more cranberry intermediate products, thereby providing, upon baking, a blueberry/cranberry flavored baked good.

In other aspects, the end consumer can be provided with a fresher product as compared to goods that are baked prior to packaging. For example, in-house bakery services, such as those found in some large grocery stores, can easily prepare batches of baked products throughout the day, each time removing and baking only the desired portions for the batch, and returning any unused portions to storages (refrigerated or frozen).

The invention can also provide significant advantages to in-house bakeries. For example, the intermediate products described herein can be packaged such that they take up less storage space in the refrigerator or freezer. Given the relatively compact portion size of the intermediate products, the compositions and systems provide significant flexibility in terms of packaging format. Moreover, the compositions and systems can generate less wasted product as compared to other formats and/or formulations. For example, prior batters packaged in large containers (such as pails or tubs) that are formulated to be dispensed from the containers can have limited storage stability after the container has been opened. As a result, the consumer has a number of days to utilize the batter before spoilage. Further, the pail/tub formats can often result in residual batter that remains in the container (for example, at the periphery of the container) that is difficult to retrieve from the container and therefore often spoils and/or dries out before it can be utilized to prepare baked products. According to formats of the invention, unused portions of the batter-like composition after partial use can be conveniently returned to frozen or refrigerated storage, to be used at a later time.

Additionally, embodiments of the batter-like compositions can provide desirable water activity, storage stability, and density properties of the batter-like compositions in frozen or refrigerated form throughout the distribution chain.

In some method aspects, the invention provides methods of preparing finished baked goods from the batter-like compositions. Conveniently, the batter-like compositions are prepared into finished baked goods by removal of the product pieces from storage (frozen or refrigerated) and placement in suitable baking conditions to form a finished baked good. The product pieces can be provided in convenient portions (for example, 2-ounce portions) that can be removed from storage and simply baked for sufficient times to form a finished baked good. In some aspects, the batter-like compositions do not require any manipulation by the consumer, such as dispensing or otherwise portioning the batter-like compositions for baking. If the consumer desires to prepare a baked good that requires more than the particular sized portion (such as a 2-ounce portion), the consumer can simply place more than one product piece in an adjacent manner in or on the bakeware (baking sheet, pan, and the like), and place the product pieces in the baking environment.

One or more advantages can be provided by the batter-like compositions. For example, as described immediately above, the batter-like compositions do not require manipulation of the batter-like composition for preparation of baked goods. The discrete physical form of the product pieces can provide a product that is easier to handle and less likely to spill or otherwise deform during handling. In some aspects, the product pieces can be immediately placed into the baking container without need for allowing the batter-like composition to thaw. If desired, however, the batter-like composition can be allowed to rest or thaw for shorter times relative to conventional batters, without serious adverse effect.

The invention can, in some aspects, also provide a baked product that is comparable to baked products prepared using conventional techniques (such as fresh batter preparation). The baked products can be comparable in terms of product attributes such as texture, mouthfeel, moistness, and specific volume. In some aspects, the batter-like compositions can be used to prepare baked goods having baked specific volume (BSV) of, for example, about 1.5-3.5 cc/g, or about 2-2.5 cc/g for muffins; BSV of about 2-3 cc/g for crescents, or about 2.5-3 cc/g for other products. In some aspects, the dimensions of the resulting baked goods can be comparable to those prepared using conventional batters. One way to view this feature is by measuring the height and spread of individual baked goods on a height/spread gauge.

While the invention is specifically described in terms of various products such as layer cakes, muffins, quick breads, cupcakes, biscuits, corn bread, brownies, and the like, the batter-like compositions can be used for or formulated for use to prepare other cooked farinaceous goods within the scope of the invention, including but not limited to, griddle cakes such as pancakes, crepes, or cornbread, Irish soda bread or waffles. Also, while the batter-like compositions are especially suited for use in preparing leavened finished goods, other finished goods can also be prepared therefrom.

The invention will now be described with reference to the following non-limiting examples.

EXAMPLES

Preparations

For the preparations described in these Examples, bench top samples were prepared and evaluated. Unless specifically stated otherwise, reference to a mixer and mixing steps for preparation of the batter-like composition refers to a Kitchen Aid standard countertop mixer, the stated speeds based upon speeds of the mixer used.

Example 1

Batter-Like Composition for Muffin Preparation According to One Embodiment of the Invention

| Formula | Ingredient | Formula % |
|---|---|---|
| Fats/Sugar | Fat source | 13 |
| | Sugar | 16 |
| Setting Agent Preparation | Water | 25 |
| | Hydrocolloid | 0.6 |
| | Nonfat Dry Milk | 3 |
| Batter Base (dry) | Flour (with enrichment) | 26 |
| | Salt | 0.7 |
| | Baking Powder | 1.5 |
| | Minors | 2 |
| Particulates | Blueberries | 12 |
| | Total | 100 |

Process—Setting Agent Preparation
1. Water for preparation of the setting agent preparation was heated to a temperature in the range of 150° F. to 160° F. (65.6° C. to about 71.1° C.).
2. Hydrocolloid and non-fat dry milk were added to the heated water while mixing under high shear using a Breddo or similar type mixer. Mix speed was in the range of 5-60 Hz. Ingredients were mixed until all were dissolved.
3. The slurry was cooled to a temperature in the range of 33° F. to 80° F. (0.6° C. to about 26.7° C.).
4. The slurry of step #3 was transferred to a holding tank and cooled to refrigerated temperatures (33° F.) (0.6° C.). The slurry was observed as "set" and firm.

Process—Batter-Like Composition
5. Sugar and fat source (shortening and oil) were creamed in a Kitchen Aid mixer on speed 4 for 2 minutes. After mixing, the bowl was scraped.

6. The "set" hydrocolloid preparation was added and mixed on speed 2 for 1 minute. After mixing, the bowl was scraped.
7. Flour and blended minor ingredients were added and mixed on speed 1 for 1 minute, then scraped and mixed on speed 1 for 1 more minute.
8. Particulates were added and mixed for 30 seconds on speed 1.

Example 1 Overall Batter-Like Composition:

| Ingredient | Formula % |
|---|---|
| Water | 25 |
| Hydrocolloid | 0.6 |
| Non-fat Dry Milk | 3 |
| Fats | 13 |
| Sugar | 16 |
| Batter base (dry) | 30 |
| Flavoring | 0.4 |
| Particulates | 12 |
| Total | 100 |

Example 2

Batter-Like Composition for Muffin Preparation According to One Embodiment of the Invention

| Formula | Ingredient | Formula % |
|---|---|---|
| Fats/Sugar | Fat source | 15 |
|  | Sugar | 26 |
| Setting Agent Preparation | Water | 20 |
|  | Hydrocolloid | 0.5 |
|  | Nonfat Dry Milk | 3.4 |
| Batter Base (dry) | Flour (with enrichment) | 29 |
|  | Chemical Leavening | 1.7 |
|  | Minors | 2.7 |
| Particulates | Blueberries | 6 |

Process—Setting Agent Preparation
1. Water for preparation of the setting agent preparation was heated to a temperature in the range of 150° F. to 160° F. (65.6° C. to about 71.1° C.).
2. Hydrocolloid and non-fat dry milk were added to the heated water while mixing under high shear using a Breddo or similar type mixer. Mix speed was in the range of 5-60 Hz. Ingredients were mixed until all were dissolved.
3. The slurry was cooled to a temperature in the range of 33° F. to 80° F. (0.6° C. to about 26.7° C.).
4. The slurry of step #3 was transferred to a holding tank and cooled to refrigerated temperatures (33° F.) (0.6° C.). The slurry was observed as "set" and firm.

Process—Batter-Like Composition
5. The sugar and fat source (shortening and oil) were creamed in a Kitchen Aid mixer on speed 4 for 2 minutes. After mixing, the bowl was scraped.
6. The "set" hydrocolloid solution was added to the combination of #4 and mixed on speed 2 for 1 minute. After mixing, the bowl was scraped.
7. Flour and blended minor ingredients were added to the combination of #5 and mixed on speed 1 for 1 minute, scraped and mix on speed 1 for 1 more minute.
8. Particulates were added and mixed for 30 seconds on speed 1.

Example 2 Overall Batter-Like Comoposition:

| Ingredient | Formula % |
|---|---|
| Water | 20 |
| Hydrocolloid | 0.5 |
| Non-fat Dry Milk | 3.4 |
| Fats | 15 |
| Sugar | 24.5 |
| Batter base (dry) | 29.5 |
| Flavoring | 0.5 |
| Particulates | 6.0 |
| Total | 100 |

Evaluations

Various rheological properties of the prepared examples were observed as follows. Each example was analyzed for yield value and water activity.

Yield Value

Yield value measurements for Examples 1 and 2 were carried out on a Haake VT 550 viscometer, with an MVI rotor. The viscometer was run from 100 to 300 rpm. Yield value was measured at 70° F. (21.1° C.), 50° F. (10° C.), and 40° F. (4.4° C.). Results were as follows (Ncm=Newton centimeters):

| Example | 70° F. | 50° F. | 40° F. |
|---|---|---|---|
| 1 | 0.141 Ncm | 0.268 Ncm | 0.595 Ncm |
| 2 | 0.176 Ncm | 0.304 Ncm | 0.697 Ncm |

Results illustrate that Example 2, which included less setting agent, was more viscous than Example 1.

Yield Value—Setting Agent Preparation

The Setting Agent Preparations of Example 1 and Example 2 (products of Steps 1-3 above) were visually inspected for structural integrity and yield value. Both Setting Agent Preparations exhibited a solid, generally non-flowable, firm, "set" appearance, much like Jell-O™.

Yield value measurements for the Setting Agent Preparation were also carried out using the Haake VT 550 viscometer, with an MVI rotor. The viscometer was run from 100 to 300 rpm. Yield value was measured at 40° F. (4.4° C.). Results were as follows (Ncm=Newton centimeters):

| Example | 40° F. |
|---|---|
| 1 | 0.337 Ncm |
| 2 | 0.819 Ncm |

Water Activity

Water activity instruments measure the amount of free (also referred to as unbound or active) water present in an example. A portion of the total water content present in a product is strongly bound to specific sites on the chemicals that comprise the product. The water activity of a product can be determined from the relative humidity of air surrounding the example when the air and the sample are at equilibrium. Therefore, the sample is typically provided in an enclosed space where this equilibrium can take place. Once this occurs, the water activity of the sample and the relative humidity of the air are equal. The measurement taken at equilibrium is referred to as the equilibrium relative humidity (ERH).

Water activity was measured utilizing an AquaLab water activity meter (Decagon Devices, Inc., Pullman, Wash.). Samples of product prepared in accordance with Examples 1 and 2 were placed in the sample cup provided with the equipment, in accordance with manufacturer's instructions. Samples were placed within the sealed chamber of the water activity meter. The sample was equilibrated within the headspace of the sealed chamber. Both the dew point and the sample temperatures were measured and utilized to determine the water activity.

Results were consistent with the water percentages of each formula and are summarized below.

| Example | Aw |
|---|---|
| Example 1 | 0.928 |
| Example 2 | 0.855 |

Example 3

Batter-Like Composition for Muffin Preparation According to One Embodiment of the Invention

| Formula | Ingredient | Formula % |
|---|---|---|
| Fats/Sugar | Fat source | 8 |
| | Sugar | 27 |
| Setting Agent Preparation | Water | 20 |
| | Hydrocolloid | 0.8 |
| | Nonfat Dry Milk | 0.93 |
| | Glycerin | 3.0 |
| Batter Base (dry) | Flour (with enrichment) | 5 |
| | Artificial Flour | 21.5 |
| | Salt | 1.1 |
| | Baking Powder | 0.5 |
| | Minors | 2 |
| Particulates | Blueberries | 7 |
| | Total | 100 |

Process—Setting Agent Preparation
1. Water, glycerin and non-fat dry milk for preparation of the setting agent preparation was heated to a temperature in the range of 160° F. to 180° F. (71.1° C. to 82.2° C.).
2. The hydrocolloid is added to the heated water while mixing under high shear using a Breddo or similar type mixer. Mix speed was in the range of 5-60 Hz. Ingredients were mixed until all were dissolved.
3. The setting agent preparation was cooled to a temperature in the range of 33° F. to 80° F. (0.6° C. to 26.7° C.).
4. The setting agent preparation of step #3 was transferred to a holding tank and cooled to refrigerated temperatures (33° F.) (0.6° C.) or pumped onto a drum chiller and cooled to refrigerated temperatures. The setting agent preparation was observed as "set" and firm.

Process—Batter-Like Composition
5. All the dry materials and the fat source were smized using a ribbon blender.
6. The "set" hydrocolloid preparation was added to the dry mixture and mixed at 80 rpm for 2 minutes using a Sigma style mixer.
7. Particulates were added and mixed for 30 seconds at 40 rpm.

Example 3 Overall Batter-Like Composition:

| Ingredient | Formula % |
|---|---|
| Water | 20 |
| Hydrocolloid | 0.8 |
| Non-fat Dry Milk | 0.93 |
| Glycerin | 3 |
| Fats | 8 |
| Sugar | 27 |
| Flour | 5 |
| Artificial Flour | 21.5 |
| Minors | 6 |
| Particulates | 7 |
| Total | 100 |

Evaluations:
Water activity and Baked Specific Volume

| | Water Activity | Baked Specific Volume cc/g |
|---|---|---|
| Week 0 | 0.854 | 2.62 |
| Week 4 | 0.839 | 1.94 |
| Week 9 | 0.847 | 2.05 |

Other embodiments of this invention will be apparent to those skilled in the art upon consideration of this specification or from practice of the invention disclosed herein. Variations on the embodiments described herein will become apparent to those of skill in the relevant arts upon reading this description. The inventors expect those of skill to use such variations as appropriate, and intend to the invention to be practiced otherwise than specifically described herein. Accordingly, the invention includes all modifications and equivalents of the subject matter recited in the claims as permitted by applicable law. Moreover, any combination of the above-described elements in all possible variations thereof is encompassed by the invention unless otherwise indicated. All patents, patent documents, and publications cited herein are hereby incorporated by reference as if individually incorporated. In case of conflict, this specification, including definitions, will control.

What is claimed is:

1. A method comprising:
(a) hydrating a setting agent comprising xanthan gum and locust bean gum with a liquid under conditions sufficient to provide a non-flowable setting agent preparation comprising about 0.25 to about 1.5 weight percent setting agent and about 80 to about 95 weight percent water and having a yield value in the range of about 0.2 Newton centimeters to about 3 Newton centimeters at 40° F. (4.4° C.);
(b) combining the setting agent preparation comprising about 80 to about 95 weight percent water with flour or flour replacement ingredient, sweetener, and fat source to form a non-flowable batter-like composition, wherein the setting agent preparation is present in an amount in the range of about 10 to about 30 weight percent of the non-flowable batter-like composition, and in the form of a continuous phase throughout the non-flowable batter-like composition; and
(c) extruding the non-flowable batter-like composition to form substantially non-sticky discrete units.

2. The method according to claim 1 wherein hydrating the setting agent comprises heating the setting agent and liquid to form a non-flowable setting agent preparation.

3. The method according to claim 1 wherein the setting agent preparation of step (a) is present in an amount in the range of about 15 to about 30 weight percent, based upon total weight of the batter-like composition.

4. The method according to claim 1 wherein the setting agent further comprises carrageenan.

5. The method according to claim 1 wherein step (b) further comprises combining humectant with the setting agent preparation.

6. The method according to claim 1 wherein step (b) comprises combining the setting agent preparation with flour or flour replacement ingredient, sweetener, and fat source-to form a generally non-flowable batter-like composition that retains its original discrete shape at temperatures above about 42° F. (5.6° C.).

7. The method according to claim 1 wherein the non-flowable batter-like composition has a water activity in the range of 0.80 to 0.928.

8. The method according to claim 1 wherein the non-flowable batter-like composition has a total moisture content in the range of about 16% to about 45%.

9. The new method according to claim 1 further comprising freezing the discrete units.

10. The method according to claim 9 further comprising baking the frozen units.

11. The method according to claim 9 further comprising at least partially thawing the frozen units.

12. The method according to claim 11 further comprising baking the at least partially thawed units.

13. A method comprising:
  (a) heating a setting agent comprising xanthan gum and locust bean gum and a liquid to provide a non-flowable setting agent preparation comprising about 0.25 to about 1.5 weight percent setting agent and about 80 to about 95 weight percent water;
  (b) combining the setting agent preparation comprising about 80 to about 95 weight percent water with flour or flour replacement ingredient, sweetener, and fat source to form a non-flowable batter-like composition, wherein the setting agent preparation comprises about 15 to 30 weight percent of the non-flowable batter-like composition and is present in the form of a continuous phase throughout the non-flowable batter-like composition; and
  (c) forming the non-flowable batter-like composition into substantially non-sticky discrete units.

14. The method according to claim 13 wherein step (c) comprises extruding the batter-like composition and cutting the batter-like composition to form discrete, non-flowable product units.

15. The method according to claim 13 wherein the non-flowable batter-like composition has a water activity in the range of 0.80 to 0.928.

16. The method according to claim 13 wherein the non-flowable batter-like composition has a total moisture content in the range of about 16% to about 45%.

17. The method according to claim 13 further comprising freezing the discrete units to form frozen units.

18. The method according to claim 17 further comprising baking the frozen units.

19. The method according to claim 17 further comprising at least partially thawing the frozen units.

20. The method according to claim 19 further comprising baking the at least partially thawed units.

* * * * *